(12) United States Patent
Koike

(10) Patent No.: US 7,016,005 B2
(45) Date of Patent: Mar. 21, 2006

(54) LIQUID CRYSTAL DISPLAY DEVICE HAVING DISPERSED PICTURE ELEMENT ELECTRODES

(75) Inventor: Yoshio Koike, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 100 days.

(21) Appl. No.: 10/737,183

(22) Filed: Dec. 16, 2003

(65) Prior Publication Data

US 2004/0150777 A1    Aug. 5, 2004

(30) Foreign Application Priority Data

Dec. 18, 2002  (JP)  .............................. 2002-366453
Dec. 8, 2003   (JP)  .............................. 2003-408559

(51) Int. Cl.
*G02F 1/1343*    (2006.01)

(52) U.S. Cl. .................. 349/144; 349/108; 349/139; 349/143

(58) Field of Classification Search ................. 349/48, 349/108, 139, 143, 144; 345/694
See application file for complete search history.

(56) References Cited

U.S. PATENT DOCUMENTS

| | | | | |
|---|---|---|---|---|
| 4,812,017 A | * | 3/1989 | Piper .......................... | 349/144 |
| 4,936,656 A | * | 6/1990 | Yamashita et al. ............. | 349/8 |
| 5,528,396 A | * | 6/1996 | Someya et al. ............... | 349/43 |

FOREIGN PATENT DOCUMENTS

| | | |
|---|---|---|
| JP | 1-306819   | 12/1989 |
| JP | 5-119310   | 5/1993  |
| JP | 2000-98128 | 4/2000  |

* cited by examiner

*Primary Examiner*—Dung T. Nguyen
*Assistant Examiner*—Michael H. Caley
(74) *Attorney, Agent, or Firm*—Greer, Burns & Crain, Ltd.

(57) ABSTRACT

In a liquid crystal display device, a plurality of picture element electrodes are electrically connected to a plurality of active elements formed in a color display pixel region, and the plurality of picture element electrodes to be connected to the respective active element are dispersed so as not to be adjacent to one another. Moreover, color filters of the same color are opposed to the plurality of picture element electrodes to be connected to the same active element.

17 Claims, 25 Drawing Sheets

LIQUID CRYSTAL DISPLAY DEVICE HAVING DISPERSED PICTURE ELEMENT ELECTRODES

CROSS-REFERENCE TO RELATED APPLICATIONS

This application is based upon and claims priority of Japanese Patent Applications No. 2002-366453, filed on Dec. 18, 2002 and No. 2003-408559, filed on Dec. 8, 2003, the contents being incorporated herein by reference.

BACKGROUND OF THE INVENTION

1. Field of the Invention

The present invention relates to liquid crystal display devices, more specifically, to a liquid crystal display device used not only for small-size display but also for a large-size display panel such as a television.

2. Description of the Prior Art

A widely used active matrix liquid crystal display device includes thin film transistors (TFTs), picture element electrodes, and a counter electrode (a common electrode). Liquid crystal between the picture element electrode and the counter electrode is driven by applying a desired voltage between the picture element electrode and the counter electrode through a TFT. In this way, an image is displayed on a liquid crystal display panel.

A liquid crystal display device for color display further includes color filters of a plurality of colors on a substrate where the counter electrode is formed. Red, green, and blue filters are arranged so as to correspond to respective picture elements.

Each pixel region for color display is divided into three picture element regions. Moreover, the TFT and the picture element electrode are disposed in each of the three picture element regions, and a red, green or blue filter is disposed opposite to each picture element electrode. Three picture elements in red, green, and, blue collectively constitute one pixel.

Delta arrangement is adopted to some of small-size display devices and medium-size display devices as a mode of arranging three-color filters for pixels. However, in most liquid crystal display devices including ones used for televisions, red, green, and blue filters are aligned in the same direction in this order.

Liquid crystal display devices are growing in size and are now applied not only to computers but also to television display devices. However, although color liquid crystal display devices have been provided with higher resolutions as the size thereof have been increased, pixels of some color liquid crystal display devices particularly of those used for televisions are relatively large. Therefore, those used for televisions or the like are considered to have coarse color picture display.

A method of arranging color filters is disclosed in Japanese Patent Publication (KOKAI) 2000-98128 (hereinafter, referred to as Patent Reference 1). In the method, red, green, and blue rectangular patterns each in the same size are repeatedly arranged two by two in one pixel region surrounded by a black matrix.

However, TFTs as many as filter patterns are required when color filters are arranged in a conventional liquid crystal display device according to Patent Reference 1. In other words, along with the increase in the number of filters in a pixel region, there are also increases in the number not only of the TFTs but also of bus lines. In addition, the technique disclosed in Patent Reference 1 aims at reduction of unevenness at a boundary portion in photo composing which becomes necessary with upsizing. Though the technique may seem to be similar to the present invention at the first glance, it actually requires completely different techniques, designs, and configurations. Moreover, uneven shots may occur in shot boundary portions.

Coarseness of image display may be eliminated when a high-resolution liquid crystal display device is configured according to the prior art. However, the prior art cannot avoid problems such as reduction in yields, or price increases attributable to complex structures.

SUMMARY OF THE INVENTION

An object of the present invention is to provide a liquid crystal display device which can achieve fine color image display even in the case of large size.

The above-described problems can be solved by a liquid crystal display device formed by filling liquid crystal between a pair of substrates and provided with a plurality of picture element regions defined by gate bus lines and drain bus lines, the liquid crystal display device comprising: active elements respectively formed in the plurality of the picture element regions; a first picture element electrode disposed in part of a first picture element region and in at least any one of part of a second picture element region and part of a third picture element region, where the first picture element region, the second picture element region, and the third picture element region are part of the plurality of picture element regions, the first picture element electrode being electrically connected to the active element in the first picture element region; a second picture element electrode disposed in part of the second picture element region and in at least any one of part of the first picture element region and part of the third picture element region, the second picture element electrode being electrically connected to the active element in the second picture element region; a third picture element electrode disposed in part of the third picture element region and in at least any one of part of the first picture element region and part of the second picture element region, the third picture element electrode being electrically connected to the active element in the third picture element region; a first color filter dispersedly arranged to correspond to the first picture element electrode; a second color filter dispersedly arranged to correspond to the second picture element electrode; and a third color filter dispersedly arranged to correspond to the third picture element electrode.

According to the present invention, in the plurality of picture element regions for color display, the plurality of picture element electrodes are electrically connected to the each of the plurality of active elements. At the same time, the plurality of picture element electrodes to be connected to the respective active elements are isolated and dispersed so as not to be adjacent to one another, and the picture element electrodes which are connected to the same active element and are isolated and dispersed from one another are opposed to color filters of the same color.

The electrodes connected to the same active element but isolated and dispersed from one another are disposed in mutually different picture element regions, and are linked to light transmitting filters of the same color.

In this way, respective filters of a plurality of colors within the color pixel region are isolated and dispersed more densely than in a conventional one. Accordingly, in a picture element region, light in the respective colors which passed through the color filters in the plurality of colors is well mixed than in a conventional one and is emitted from a display device. Therefore, the existence of different-color filters becomes inconspicuous even if the pixel regions grow in size along with an increase in size of the liquid crystal display device, and coarseness of image quality is dramatically improved as a consequence.

Moreover, since the number of the active elements are fewer than the picture element electrodes opposed to the filters in the plurality of colors, increases in the number of the bus lines and the active elements are suppressed. In this way, it is possible to maintain the same yields as before and to prevent complexity of structures.

DETAILED DESCRIPTION OF THE PREFERRED EMBODIMENTS

Now, preferred embodiments of the present invention will be described below based on the accompanying drawings.

First Embodiment

Figure 1:
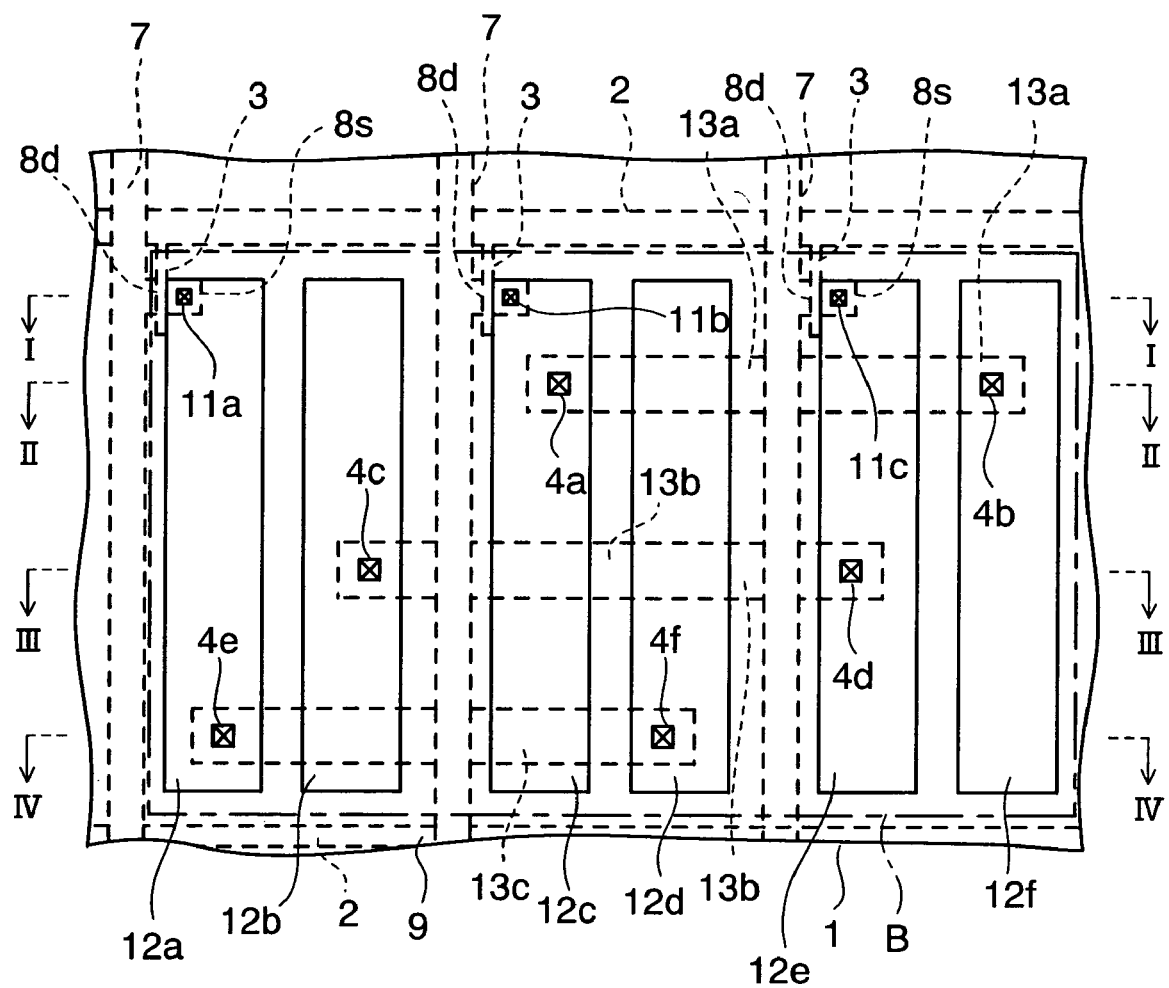
FIG. 1 is a plan view showing a pixel region on a TFT substrate of a liquid crystal display device according to a first embodiment of the present invention.
Figure 2:
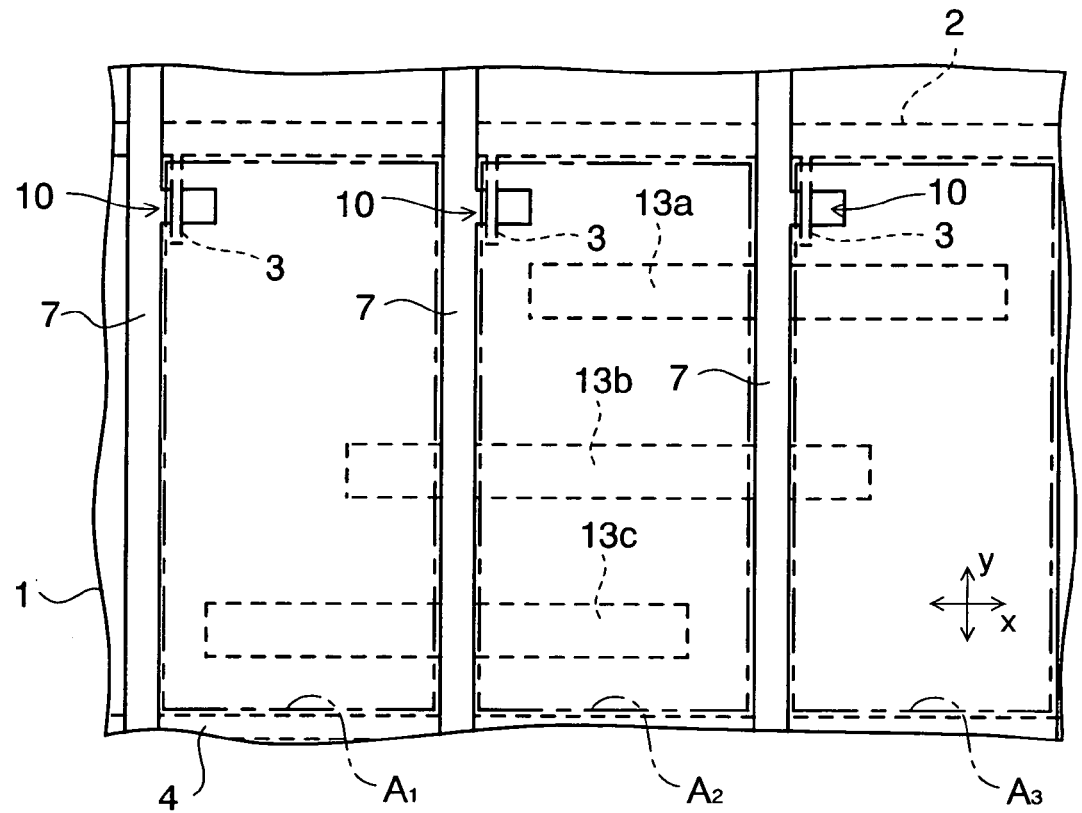
FIG. 2 is a plan view showing arrangement of bus lines, interconnections, and TFTs in the pixel region on the TFT substrate of the liquid crystal display device according to the first embodiment of the present invention.
Figure 3:
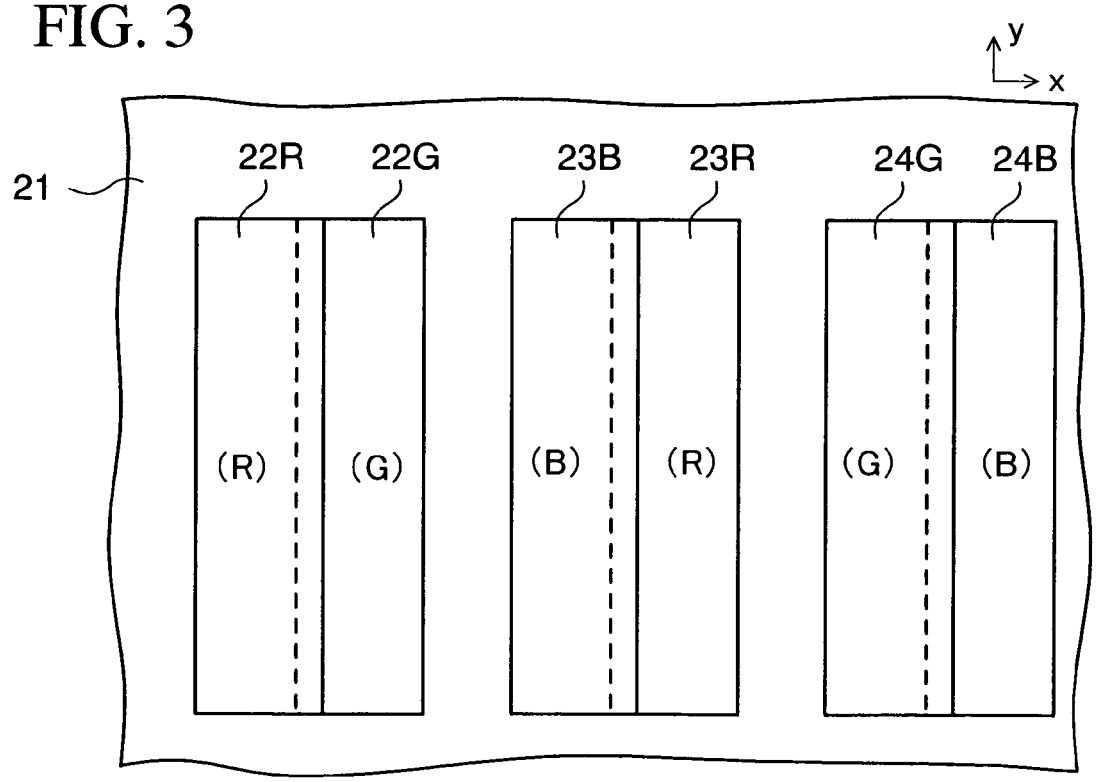
FIG. 3 is a plan view showing color filters formed on a counter electrode side of the liquid crystal display device according to the first embodiment of the present invention.

FIG. 1 is a plan view showing a pixel region on a TFT substrate of a liquid crystal display device according to a first embodiment of the present invention. FIG. 2 is a plan view showing arrangement of bus lines, interconnections, and TFTs to be formed below picture element electrodes shown in FIG. 1. FIG. 3 is a plan view showing color filters formed on a counter electrode side of the liquid crystal display device according to the first embodiment of the present invention.

Further, FIG. 4, FIG. 5, FIG. 6, and FIG. 7 are cross-sectional views of the liquid crystal display device according to the first embodiment of the present invention, which are taken along the I—I line, the II—II line, the III—III line, and the IV—IV line in FIG. 1, respectively.

In an image display region shown in FIG. 1 to FIG. 7, a first substrate 1 and a second substrate 20 are disposed opposite to each other with provision of space, and liquid crystal 19 is filled between the first substrate 1 and the second substrate 20.

Next, the first substrate 1 and a layer structure thereon will be described.

As shown in FIG. 1 and FIG. 2, a plurality of gate bus lines (scan bus lines) 2 extending in an x direction (a lateral direction in the drawing) are formed directly or through an insulating film on the first substrate 1 which is made of a light transmitting insulative material such as glass, vitreous silica or a plastic film, at intervals of 600 m in a y direction (a longitudinal direction in the drawing), for example. Together with a plurality of drain bus lines to be described later, the plurality of gate bus lines 2 define approximately rectangular picture element regions $A_1$, $A_2$ and $A_3$. The x direction and the y direction are orthogonal to each other. Moreover, the three picture element regions $A_1$, $A_2$ and $A_3$ which are adjacent along the x direction are disposed in one pixel region B.

In this embodiment and in other embodiments to be described later, it is to be noted that multiple sets of the picture element regions $A_1$, $A_2$ and $A_3$ are arranged lengthwise and crosswise in a matrix fashion.

Of the gate bus lines 2, a gate electrode 3 is formed at each corner portion in the picture element region $A_1$, $A_2$ or $A_3$ so as to protrude in one direction along the y direction. The gate bus lines 2 and the gate electrodes 3 are formed by patterning a conductive film which applies a stacked structure of aluminum (Al) and titanium (Ti) being serially formed on the substrate 1, for example, by use of a photolithography method.

Figure 4:
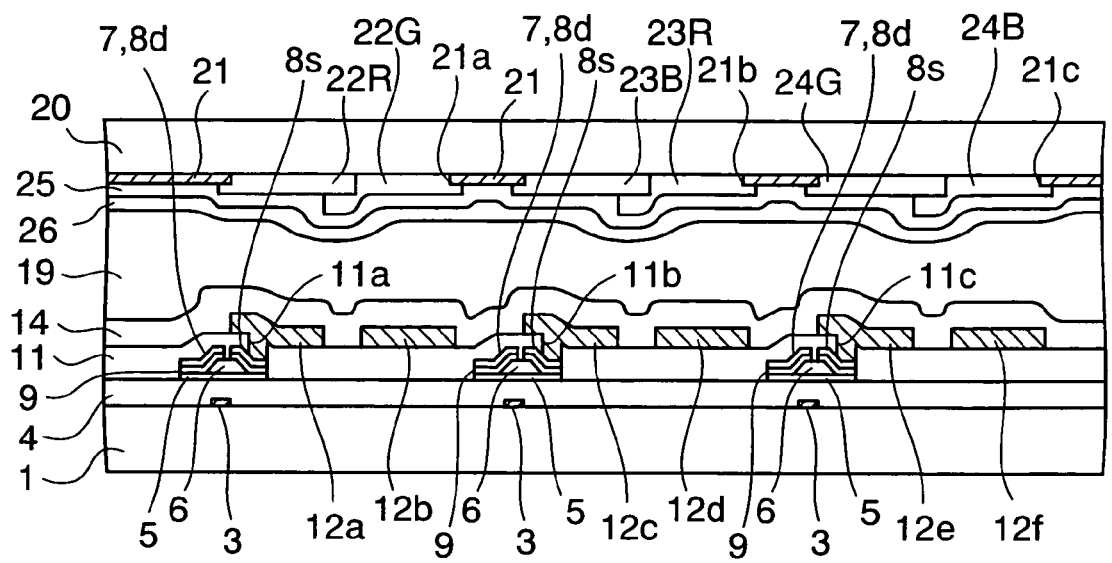
FIG. 4 is a first cross-sectional view of the pixel region of the liquid crystal display device according to the first embodiment of the present invention.

As shown in FIG. 4, the first substrate 1, the gate bus lines 2, and the gate electrodes 3 are covered with a gate insulating film 4. As the gate insulating film 4, silicon nitride in a thickness of 400 nm is formed by use of a plasma enhanced chemical vapor deposition (PE-CVD) method.

On the gate insulating film 4, active layers 5 made of undoped amorphous silicon (a semiconductor) in a thickness from 20 to 100 nm are formed over the gate electrodes 3 and in the periphery thereof into approximately rectangular planar shapes. Moreover, channel protective insulating films 6 are formed into island shapes over the gate electrodes 3 on the active layers 5. The channel protective insulating films 6 are formed by patterning a silicon nitride film in a thickness of about 140 nm formed on the active layers 5 and the gate insulating film 4 by use of the PE-CVD method.

Moreover, as shown in FIG. 1 and FIG. 2, a plurality of drain bus lines (data bus lines) 7 extending in the y direction and defining the picture element regions $A_1$, $A_2$, and $A_3$ are formed on the gate insulating film 4 at intervals of 200 m in the x direction, for example.

At portions of the drain bus line 7 close to intersections with the gate bus line 2, drain electrodes 8d protrude toward the gate electrodes 3 as shown in FIG. 2. Each of the drain electrodes 8d is formed above the active layer 5 on one side of the channel protective insulating film 6 and in the periphery thereof through a contact layer 9 as shown in FIG. 4.

Moreover, a source electrode 8s is formed above each of the active layers 5 on the other side of the channel protective insulating film 6 through the contact layer 9. In this way, the drain electrode 8d and the source electrode 8s constitute a TFT channel.

The contact layer 9 is made of a phosphorus-doped $n^+$ amorphous silicon film. Moreover, the drain bus lines 7, the drain electrodes 8d, and the source electrodes 8s are made of a conductive film having a stacked structure formed by stacking Ti in a thickness of 20 nm, Al in a thickness of 75 nm, and Ti in a thickness of 80 nm in this order from below, for example. The $n^+$ amorphous silicon film and the conductive film are formed on the channel protective insulating film 6, the active layer 5, and the gate insulating film 4, and are then patterned continuously by use of the same mask.

The drain electrode 8d, the source electrode 8s, the gate insulating film 4, and the active layer 5 collectively constitute a thin film transistor (TFT) 10.

The above-described TFT is an example of an active element which is called a bottom gate type or a reverse staggered type. However, it is also possible to adopt a TFT with a structure called a top gate type or a staggered type in which a gate electrode is formed above source/drain electrodes. Meanwhile, it is also possible to use other switching elements as the active element. Such substitutions are also applicable to other embodiments to be described later.

The drain bus lines 7 and the TFTs 10 are covered with a protective insulating film 11 made of either silicon oxide or silicon nitride.

In each of the first to third picture element regions $A_1$, $A_2$, and $A_3$, a first picture element electrode 12a, 12c or 12e and a second picture element electrode 12b, 12d or 12f are formed on the protective insulating film 11 with an interval in the x direction. The first and second picture element electrodes 12a to 12f are made of a transparent conductive material such as ITO (Indium-Tin Oxide) in a thickness of 70 nm, for example. Alternatively, in the case of a reflective liquid crystal display device, the picture element electrodes 12a to 12f are made of aluminum.

The first picture element electrodes 12a, 12c, and 12e are connected to the source electrodes 8s of the TFTs 10 in the respective picture element regions $A_1$, $A_2$, and $A_3$ through contact holes 11a to 11c which are formed through the protective insulating film 11.

The first picture element electrodes 12a, 12c, and 12e and the second picture element electrodes 12b, 12d, and 12f inside the first to third picture element regions $A_1$, $A_2$, and $A_3$ are severally connected to any of the first and second picture element electrodes 12a to 12f of other picture element regions through first to third interconnections 13a, 13b, and 13c.

The first, second, and third interconnections 13a, 13b, and 13c are provided on the same layer as the gate electrodes 3 and the gate bus lines 2, and are formed lengthwise in the x direction with intervals in the y direction.

The first interconnection 13a is formed in a range from a position under the first picture element electrode 12c of the second picture element region $A_2$ to a position under the second picture element electrode 12f of the third picture element region $A_3$. Meanwhile, the second interconnection 13b is formed in a range from a position under the second picture element electrode 12b of the first picture element region $A_1$ to a position under the first picture element electrode 12e of the third picture element region $A_3$. Moreover, the third interconnection 13c is formed in a range from a position under the first picture element electrode 12a of the first picture element region $A_1$ to a position under the second picture element electrode 12d of the second picture element region $A_2$.

Figure 5:
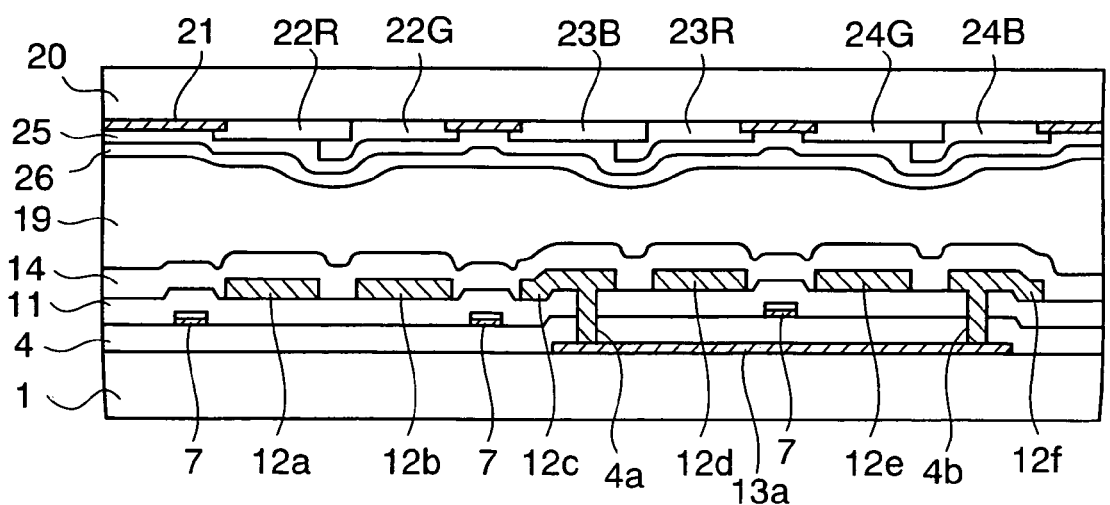
FIG. 5 is a second cross-sectional view of the pixel region of the liquid crystal display device according to the first embodiment of the present invention.

Now, as shown in FIG. 1 and FIG. 5, the first interconnection 13a electrically connects the first picture element electrode 12c in the second picture element region $A_2$ with the second picture element electrode 12f of the third picture element region $A_3$ through first and second contact holes 4a and 4*b* which are formed through the gate insulating film 4 and the protective insulating film 11.

Figure 6:
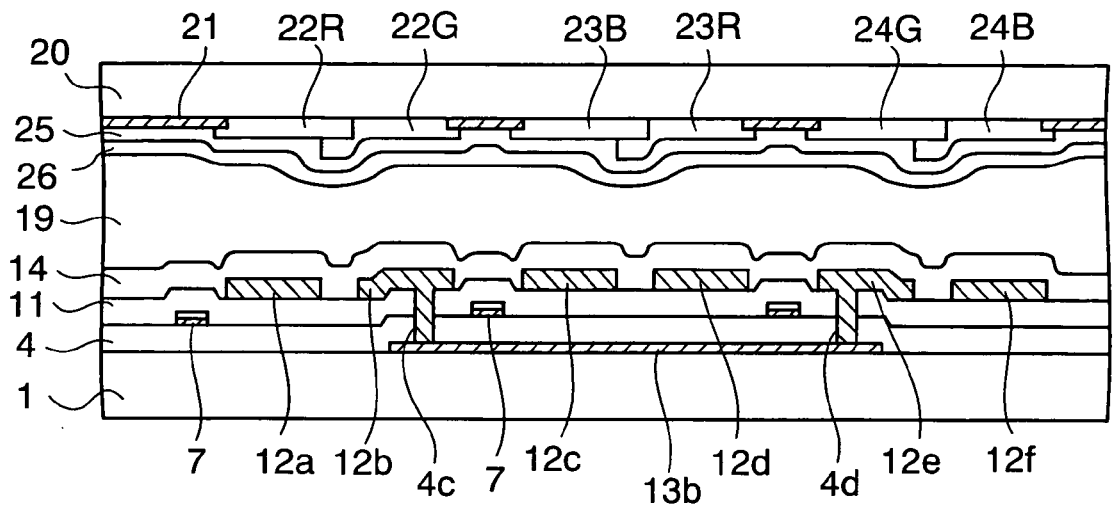
FIG. 6 is a third cross-sectional view of the pixel region of the liquid crystal display device according to the first embodiment of the present invention.

Meanwhile, as shown in FIG. 1 and FIG. 6, the second interconnection 13*b* electrically connects the second picture element electrode 12*b* in the first picture element region $A_1$ with the first picture element electrode 12*e* of the third picture element region $A_3$ through third and fourth contact holes 4*c* and 4*d* which are formed through the gate insulating film 4 and the protective insulating film 11.

Figure 7:
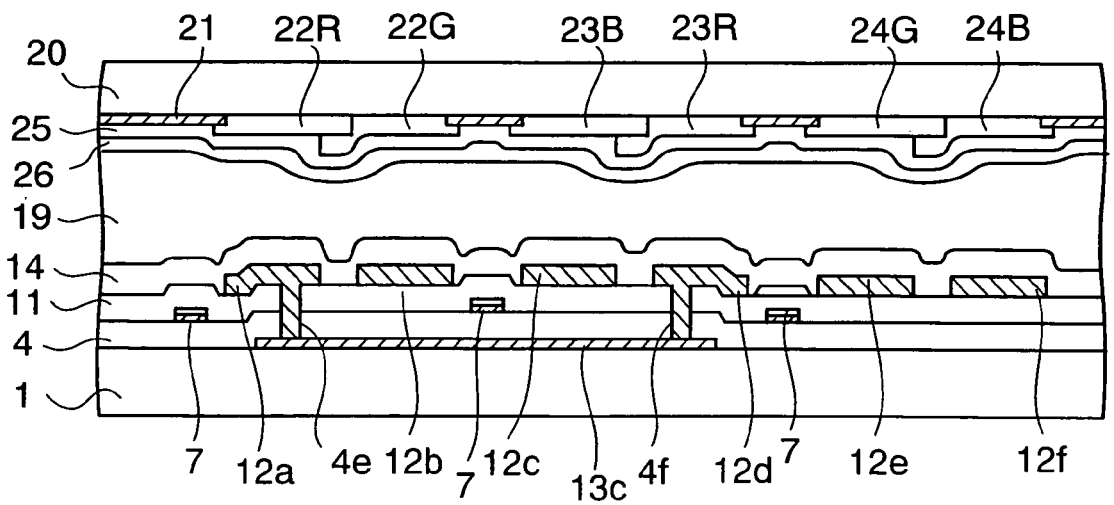
FIG. 7 is a fourth cross-sectional view of the pixel region of the liquid crystal display device according to the first embodiment of the present invention.

Moreover, as shown in FIG. 1 and FIG. 7, the third interconnection 13*c* connects the first picture element electrode 12*a* in the first picture element region $A_1$ with the second picture element electrode 12*d* of the second picture element region $A_2$ through fifth and sixth contact holes 4*e* and 4*f* which are formed through the gate insulating film 4 and the protective insulating film 11.

The plurality of first and second picture element electrodes 12*a* to 12*f* and the protective insulating film 11 are covered with a first alignment film 14 made of resin.

The first substrate 1, the TFTs 10, the picture element electrodes 12*a* to 12*f*, and the like collectively constitute a TFT substrate.

Next, the second substrate 20 and a layer structure thereon will be described.

A black matrix 21 made of a light shielding film such as Cr is formed on the second substrate 20 which is made of a light transmitting insulative material such as glass, vitreous silica or a plastic film. Apertures 21*a* to 21*c* are formed in regions of the black matrix 21 facing the above-described picture element regions $A_1$, $A_2$, and $A_3$ by use of a photolithography method. The black matrix 21 is formed into the shape so as to cover the TFTs 10 from the second substrate 20 side and to surround the picture element regions $A_1$, $A_2$, and $A_3$.

As shown in FIG. 3, a first red filter 22R facing the first picture element electrode 12*a* and a first green filter 22G facing the second picture element electrode 12*b* are formed inside the aperture 21*a* of the light shielding film 21 in the first picture element region $A_1$ on the second substrate 20. Here, FIG. 3 is illustrated so as to correspond to the pixel region B of FIG. 1. FIG. 3 illustrates arrangement viewed from a side of the second substrate 20 not facing the first substrate 1, and illustration of the second substrate 20 is omitted therein.

Meanwhile, a first blue filter 23B facing the first picture element electrode 12*c* and a second red filter 23R facing the second picture element electrode 12*d* are formed inside the aperture 21*b* of the light shielding film 21 in the second picture element region $A_2$ on the second substrate 20.

Moreover, a second green filter 24G facing the first picture element electrode 12*e* and a second blue filter 24B facing the second picture element electrode 12*f* are formed inside the aperture 21*c* of the light shielding film 21 in the third picture element region $A_3$ on the second substrate 20.

Here, the respective picture element regions $A_1$, $A_2$, and $A_3$ adopt a structure in which the filters 22R and 22G, 23B and 23R, and 24G and 24B which are adjacent to each other and of different colors are overlapped. In the structure of overlapping the filters of different colors, a portion where the filters are overlapped functions as a light shielding film. Accordingly, it is not necessary to dispose the black matrix at that portion. Alternatively, in a structure where the filters of different colors are not overlapped, a space between the filters is supposed to be covered with the black matrix 21.

A light transmitting conductive film such as ITO is formed on the red filters 22R and 23R, the green filters 22G and 24G, the blue filters 23B and 24B, and the black matrix 21 as a counter electrode 25. Moreover, a second alignment film 26 made of resin is formed on the counter electrode 25.

In this way, the second substrate 20, the red, green, and blue filters 22R, 22G, 23B, 23R, 24G, and 24B, the counter electrode 25, and the like collectively constitute a counter substrate. Note that the respective filters are configured to transmit light corresponding to the colors thereof.

The first substrate 1 and the second substrate 20 having the above-described structures are fixed in a state where the first alignment film 14 and the second alignment film 26 are opposed to each other with provision of space. Moreover, the liquid crystal 19 is filled between the first alignment film 14 and the second alignment film 26.

Figure 8:
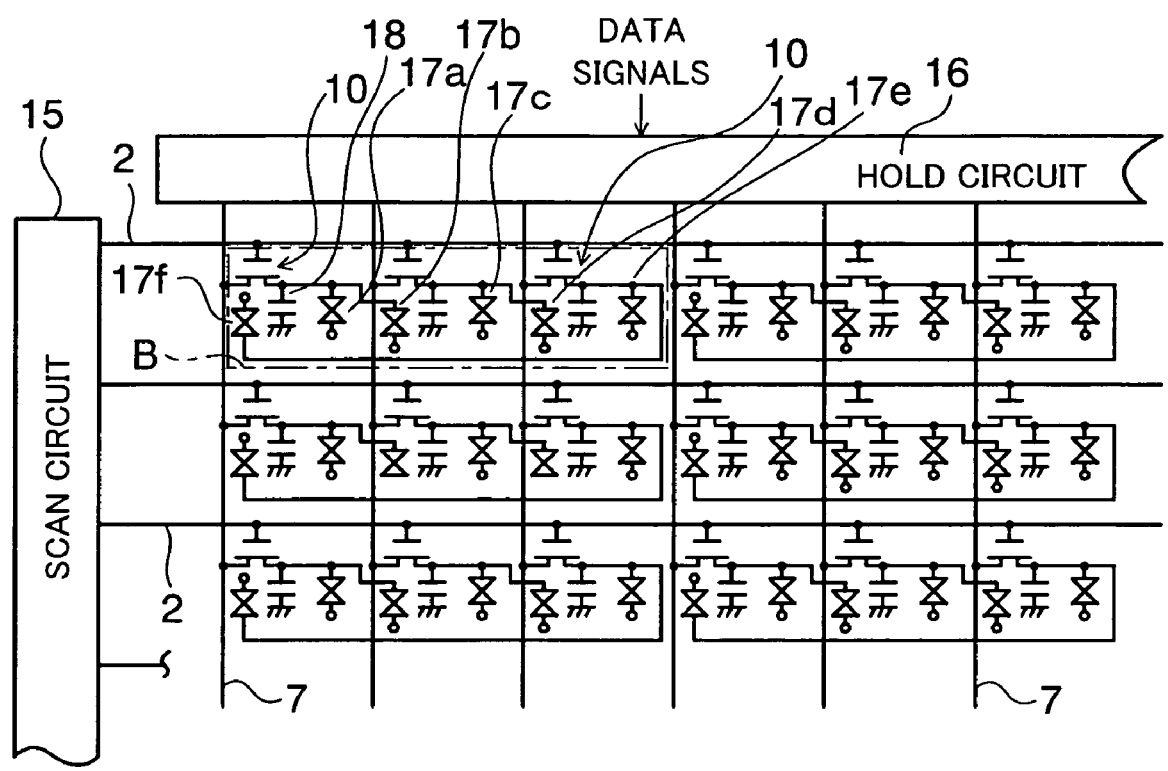
FIG. 8 is a circuit diagram of the liquid crystal display device according to the first embodiment of the present invention.

The above-described gate bus lines 2, the drain bus lines 7, and the TFTs 10 are connected to peripheral circuits as shown in the circuit diagram of FIG. 8. The plurality of gate bus lines 2 are connected to a scan circuit 15. Meanwhile, the plurality of drain bus lines 7 are connected to a hold circuit 16 to which data signals are transmitted. Moreover, as described above, the gate electrodes 3 of the TFTs 10 are connected to the gate bus lines 2 and the drain electrodes 8*d* of the TFTs 10 are connected to the drain bus lines 7. Furthermore, liquid crystal cells 17*a* to 17*f* including the picture element electrodes 12*a* to 12*f*, the counter electrode 25, and the liquid crystal 19, and auxiliary capacitors 18 are connected to the source electrodes 8*s* of the TFTs 10.

Here, auxiliary capacitor bus lines (not shown) which constitute the auxiliary capacitors 18 are formed on the first substrate 1 in regions between the gate bus lines 2. However, since the first, second, and third interconnections 13*a*, 13*b*, and 13*c* are also formed in parallel with the gate bus lines 2, the first, second, and third interconnections 13*a*, 13*b*, and 13*c* do not interfere with formation of the auxiliary capacitor bus lines.

In the above-described liquid crystal display device, a vertical alignment liquid crystal material with negative dielectric anisotropy is used as the liquid crystal 19, for example.

Moreover, when the TFT 10 inside the first picture element region $A_1$ is turned on in response to signals from the gate bus line 2 and the drain bus line 7, a voltage at the first picture element electrode 12*a* inside the first picture element region $A_1$ changes and thereby drives liquid crystal molecules thereon. Accordingly, light from outside passes through the first picture element electrode 12*a*, the liquid crystal 19, and the first red filter 22R, and the red color is displayed partially in the first picture element region $A_1$. Simultaneously, a voltage at the drain bus line 7 is applied to the second picture element electrode 12*d* of the second picture element region $A_2$ through the third interconnection 13*c* and through the first picture element electrode 12*a* and the TFT 10 inside the first picture element region $A_1$ so as to drive the liquid crystal 19 thereon. In this way, the red color is also displayed partially in the second picture element region $A_2$.

Similarly, when the TFT 10 inside the second picture element region $A_2$ is turned on, voltages at the picture element electrodes 12*c* and 12*f* respectively facing the blue filter 23B inside the second picture element region $A_1$ and the blue filter 24B inside the third picture element region $A_3$ change and thereby drive the liquid crystal 19 thereon. Accordingly, the light which is incident on the picture element electrodes 12*c* and 12*f* passes through the liquid crystal 19 and the blue filters 23B and 24B. In this way, the blue color is displayed partially inside the second picture element region $A_2$ and partially inside the third picture element region $A_3$. Moreover, when the TFT 10 inside the third picture element region $A_3$ is turned on, voltages at the picture element electrodes 12e and 12b respectively facing the blue filter 23G inside the third picture element region $A_3$ and the blue filter 24G inside the first picture element region $A_1$ change and thereby drive the liquid crystal 19 on the picture element electrodes 12e and 12b. Accordingly, the light which passes through the picture element electrodes 12e and 12b further passes through the liquid crystal 19 and the green filters 23G and 24G. In this way, the green color is displayed partially inside the third picture element region $A_3$ and partially inside the first picture element region $A_1$.

As described above, in each pixel region B, the red, green, and blue colors severally pass through two regions and are mixed together to display a desired color. Here, a color tone changes in response to the voltages at the drain bus lines 7 to be applied to the picture element electrodes.

According to this embodiment, in the pixel region B, not only the filters in different colors but also the filters of the same colors such as filters 22R and 23R, the filters 22G and 24G, and the filters 23B and 24B are spatially separated and divided, and are then mixed together in one unit. Such mixture of the colors effectuates full-color display.

Therefore, the picture elements (the picture element regions) displaying single colors of R, G, and B become inconspicuous and coarseness of image quality is substantially improved. Display quality will be improved especially in a liquid crystal display device for a large-size television. In particular, as described above, the red filters 22R and 23R, the green filters 22G and 24G, and the blue filters 23B and 24B are severally separated and divided into two pieces and the filters in the respective colors are spatially dispersed. Accordingly, as compared to a conventional structure of arranging one filter in one picture element region, it is possible to improve coarseness of image quality representing visibility of the picture elements filtered by the respective colors down to one-half.

Moreover, according to this embodiment, the red filters, the blue filters, and the green filters to be disposed in the pixel region B are spatially dispersed. In the meantime, the filters 22R, 23R, 22G, 24G, 23B and 24B in the plurality of colors are disposed in the respective picture element regions $A_1$, $A_2$, and $A_3$. Furthermore, the picture element electrodes 12a to 12f disposed in the picture element regions $A_1$, $A_2$, and $A_3$ are spatially separated so as to correspond to the number of colors of the filters 22R, 23R, 22G, 24G, 23B and 24B. In addition, the respective sets among the plurality of picture element electrodes 12a to 12f which face the plurality of filters of the same colors are electrically connected together through the interconnections 13a, 13b, and 13c disposed therebelow.

Therefore, regions of the plurality of red filters 22R and 23R, the plurality of green filters 22G and 24G, and the plurality of blue filters 23B and 24B all of which are spatially separated in the pixel region B are severally driven by the same number of the TFTs (the active elements) 10 as before. That is, one TFT 10 is configured to drive the plurality of picture element electrodes.

As a result, it is not necessary to increase the number of the active elements or the bus lines. Accordingly, it is possible to avoid reduction in yields or complexity of structures.

Here, it is also possible to adopt the structure to be described in the subsequent second embodiment as the color filters. Meanwhile, it is possible to form the color filters on the TFT substrate instead of the second substrate. In short, it is satisfactory as long as the color filters are dispersedly arranged so as to face the first, second, and third picture element electrodes. Such modifications are also applicable to other embodiments to be described later.

Second Embodiment

The first embodiment adopts the structure in which the picture element electrodes 12a to 12f disposed in the picture element regions $A_1$, $A_2$, and $A_3$ are electrically connected to the picture element electrodes 12a to 12f of other picture element regions $A_1$, $A_2$, and $A_3$, respectively, through the interconnections 13a, 13b, and 13c.

In this embodiment, description will be made on a structure of integrally forming the picture element electrodes 12a to 12f corresponding to the color filters of the same colors without using the interconnections 13a, 13b, and 13c.

Figure 9:
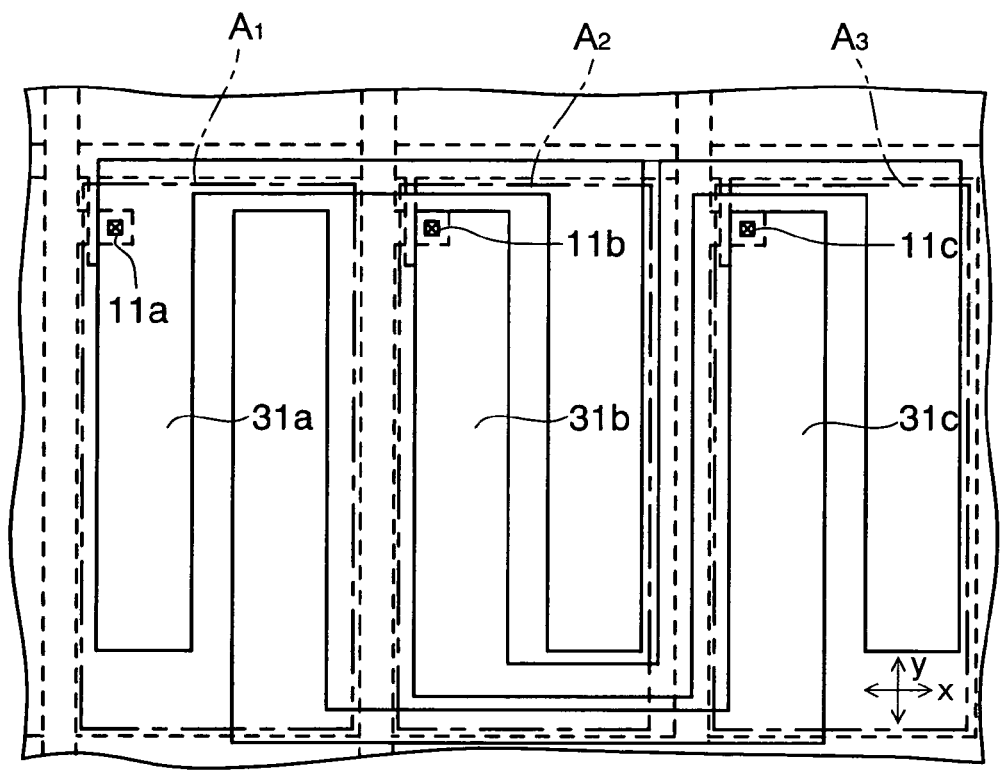
FIG. 9 is a plan view showing a pixel region on a TFT substrate of a liquid crystal display device according to a second embodiment of the present invention.
Figure 10:
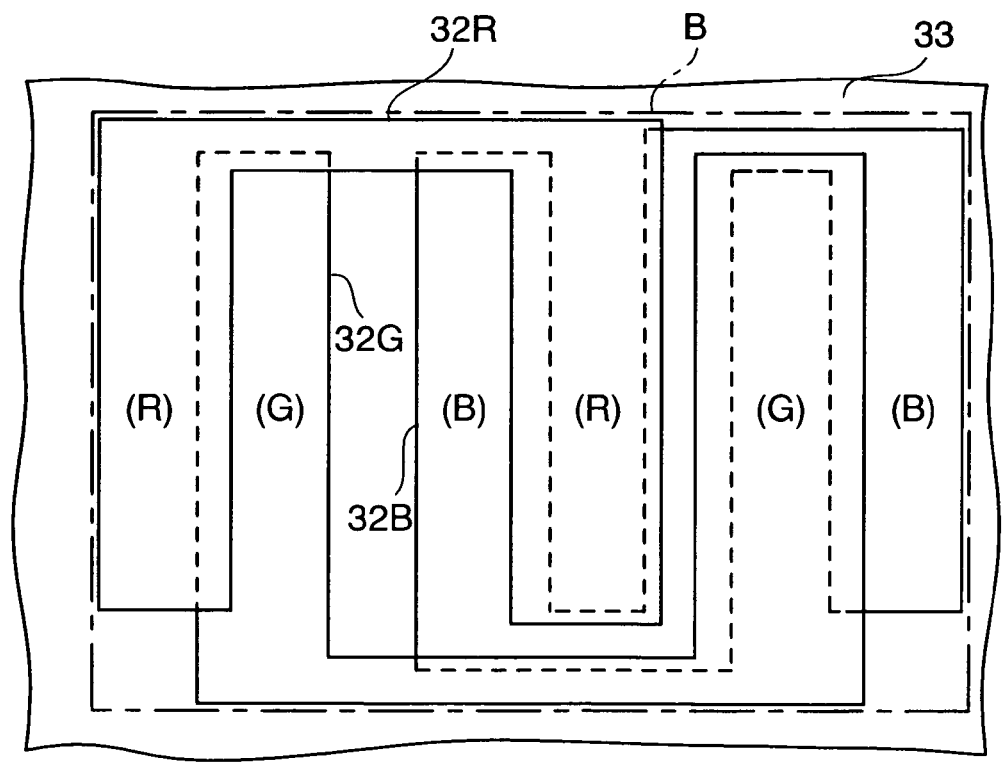
FIG. 10 is a plan view showing color filters formed on a counter electrode side of the liquid crystal display device according to the second embodiment of the present invention.

FIG. 9 is a plan view showing a pixel region on a TFT substrate of a liquid crystal display device according to a second embodiment of the present invention, and FIG. 10 is a plan view showing color filters formed on a counter electrode side of the liquid crystal display device according to the second embodiment of the present invention. Note that FIG. 10 is the plan view which is viewed from a side of the second substrate where the color filters and the black matrix are not formed thereon.

In the liquid crystal display device of this embodiment, the protective insulating film 11 and the structure therebelow on the first substrate 1 is configured as similar to the first embodiment except formation of the first to third interconnections 13a to 13c and the contact holes 4a to 4f.

As shown in FIG. 9, first to third picture element electrodes 31a to 31c made of a transparent conductive material are formed on the protective insulating film 11 in the first to third picture element regions $A_1$, $A_2$, and $A_3$. In the case of a reflective liquid crystal display device, the picture element electrodes 31a to 31c are made of aluminum.

The first picture element electrode 31a is drawn out of a portion in the first picture element region $A_1$ to a portion of the second picture element region $A_2$ along the gate bus line 2, so that the planar shape thereof is formed into an approximately U-shape. In the first picture element region $A_1$, the first picture element 31a is formed in a region close to the drain bus line 7 to be connected to the TFT 10. Moreover, in the second picture element region $A_2$, the first picture element electrode 31a is formed in a region close to the third picture element region $A_3$. The first picture element electrode 31a is connected to the source electrode 8s of the TFT 10 in the first picture element region $A_1$ through the contact hole 11a.

The second picture element electrode 31b is drawn out of a portion in the second picture element region $A_2$ to the third picture element region $A_3$ along the gate bus lines 2 and the drain bus line 7, so that the planar shape thereof is formed into an approximately S-shape. The second picture element electrode 31b is drawn out to a portion of the third picture element region $A_3$ along an outer periphery of the first picture element electrode 31a in the second picture element region $A_2$ with provision of an interval. Moreover, the second picture element electrode 31b is connected to the source electrode 8s of the TFT 10 through the contact hole 11b in the second picture element region $A_2$, and is formed in a half region away from the TFT 10 in the x direction in the third picture element region $A_3$.

The third picture element electrode 31c is drawn out of a portion in the third picture element region $A_3$ to a portion of the first picture element region $A_1$ along the gate bus line 2, so that the planar shape thereof is formed into an approximately U-shape. In the third picture element region $A_3$, the third picture element electrode 31c is formed in a region close to the drain bus line 7 to be connected to the TFT 10. Moreover, in the first picture element region $A_1$, the third picture element electrode 31c is formed in a region close to the second picture element region $A_2$. The third picture element electrode 31c is connected to the source electrode 8s of the TFT 10 in the third picture element region $A_3$ through the contact hole 11c.

The above-described first picture element electrode 31a adopts an integrated structure in which the first picture element electrode 12a in the first picture element region $A_1$ and the second picture element electrode 12d in the second picture element region $A_2$ shown in the first embodiments are directly connected together on the protective insulating film 11 through bridge electrodes provided along edge portions of the first and second picture element regions $A_1$ and $A_2$.

Similarly, the third picture element electrode 31c adopts an integrated structure in which the first picture element electrode 12e in the third picture element region $A_3$ and the second picture element electrode 12b in the first picture element region $A_1$ shown in the first embodiments are directly connected together on the protective insulating film 11 through bridge electrodes provided along edge portions of the first to third picture element regions $A_1$, $A_2$ and $A_3$. Moreover, the second picture element electrode 31b adopts an integrated structure in which the first picture element electrode 12c in the second picture element region $A_2$ and the second picture element electrode 12f in the third picture element region $A_3$ shown in the first embodiments are directly connected together on the protective insulating film 11 through bridge electrodes provided along edge portions of the first to third picture element regions $A_1$, $A_2$ and $A_3$.

Meanwhile, the color filters to be formed on the second substrate 20 have the shapes so as to face the first to third picture element electrodes 31a to 31c. For example, as shown in FIG. 10, a red filter 32R has a planar shape of an approximately U-shape facing the first picture element electrode 31a, a green filter 32G has a planar shape of an approximately U-shape facing the third picture element electrode 31c, and a blue filter 32B has a planar shape of an approximately S-shape facing the second picture element electrode 31b. The red filter 32R, the green filter 32G, and the blue filter 32B overlap one another at respective boundary portions to constitute light shielding regions. However, it is also possible to configure the color filters not to overlap one another.

A black matrix 33 having apertures in positions of formation of the filters 32R, 32G, and 32B is formed on the second substrate 20 where these filters 32R, 32G, and 32B are to be provided. Moreover, a counter electrode (not shown) and an alignment film (not shown) are serially formed on the black matrix 33 and the filters 32R, 32G, and 32B.

Here, it is also possible to use the color filters of the same shapes as shown in FIG. 3 concerning the first embodiment as the filters on the second substrate 20.

The above-described picture element electrodes 31a to 31c, and the red, green, and blue filters 32R, 32G, and 32B are spatially dispersed in the pixel region B as similar to the first embodiment. Accordingly, the color filters in three colors become inconspicuous even when the picture element regions grow in size such as in a case of a display panel for a large-size television. As a result, image quality is substantially improved.

In addition, the first to third picture element electrodes 31a to 31c are dispersed in the plurality of picture element regions in response to the dispersed red, green, and blue filters 32R, 32G, and 32B. Accordingly, the number of the TFTs 10 is not increased. In this case, the dispersed picture element electrodes 31a to 31c are two-dimensionally connected together on the protective insulating film 11 unlike the first embodiment, and it is therefore necessary to devise the planar shapes. However, a new process will not be added to a conventional pixel formation process.

Third Embodiment

In the first and second embodiments, the red, green, and blue filters are dispersed in two picture element regions in each pixel region B. However, it is also possible to disperse the filters into three or more positions. Accordingly, this embodiment will describe a structure of dispersing each of the red, green, and blue filters into three positions in each pixel region.

Figure 11:
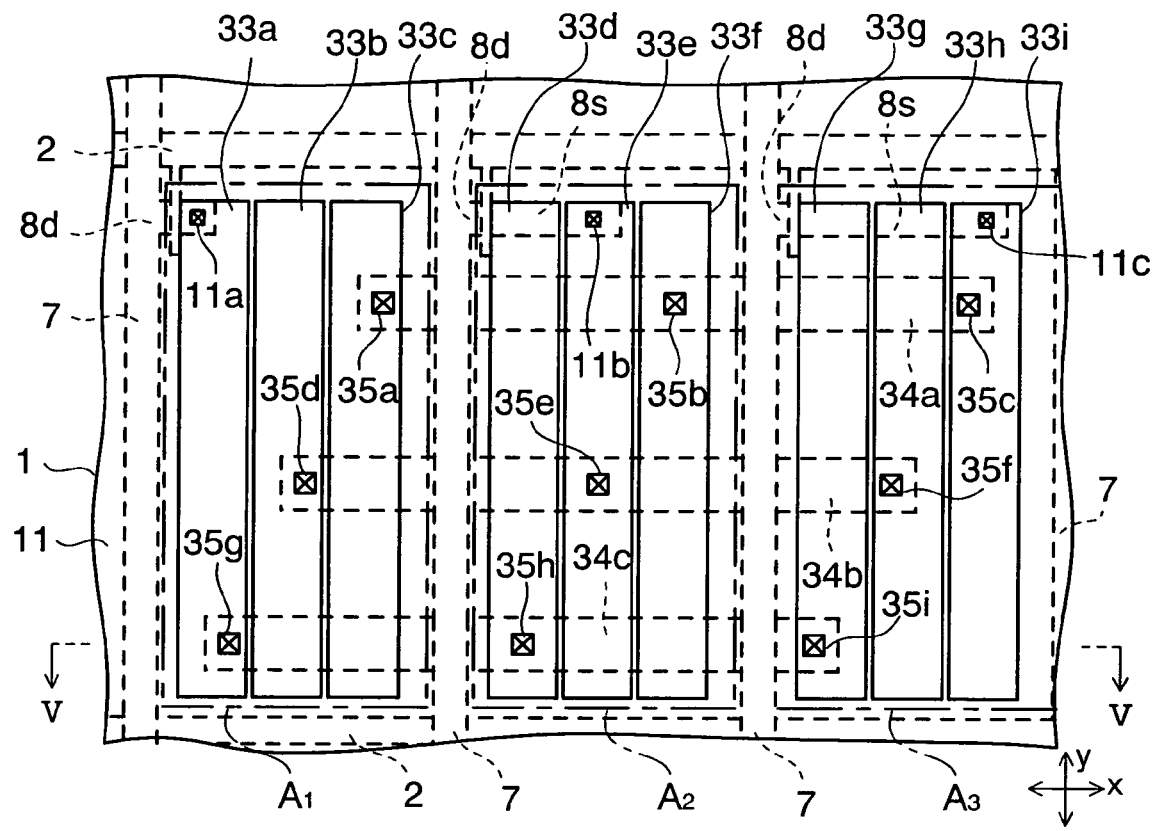
FIG. 11 is a plan view showing a pixel region on a TFT substrate of a liquid crystal display device according to a third embodiment of the present invention.
Figure 12:
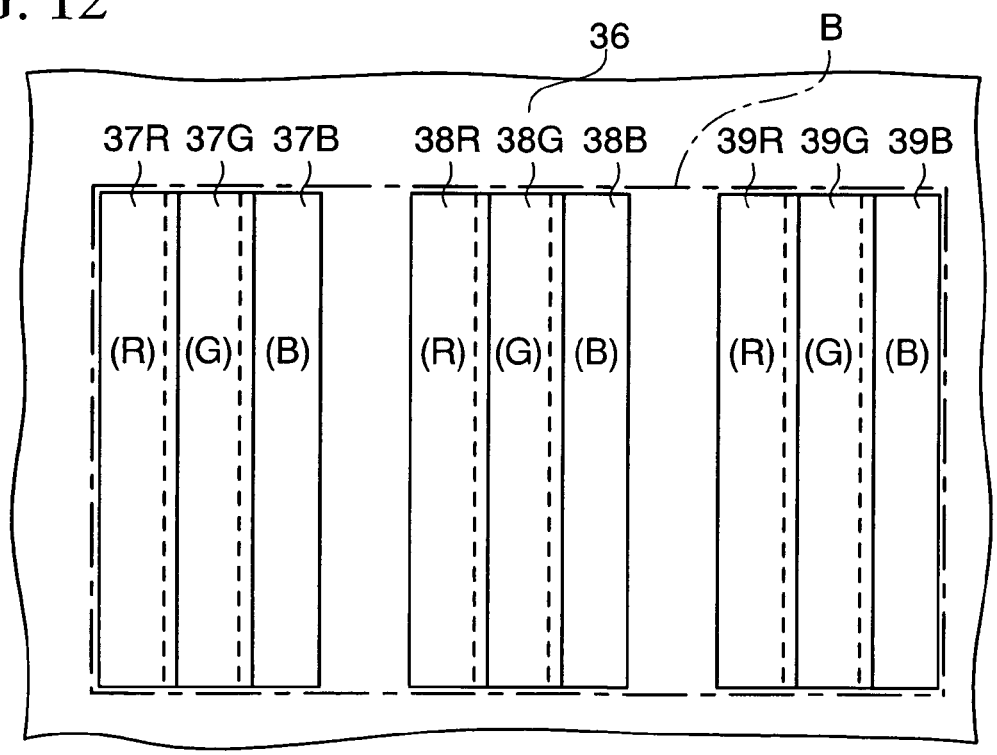
FIG. 12 is a plan view showing color filters formed on a counter electrode side of the liquid crystal display device according to the third embodiment of the present invention.
Figure 13:
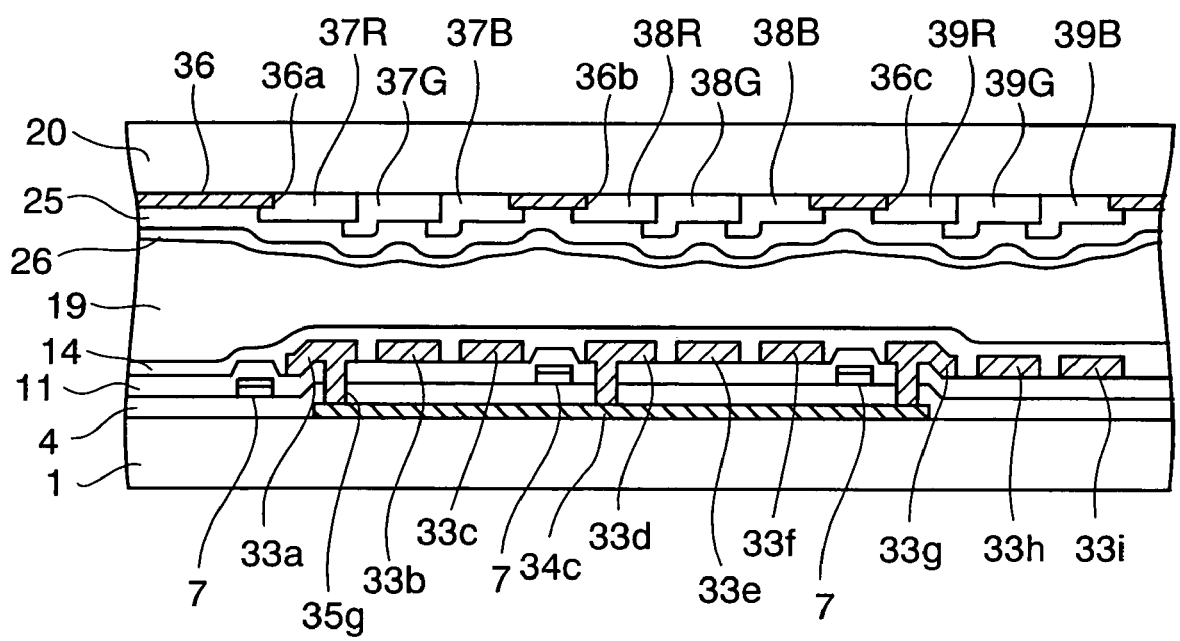
FIG. 13 is a cross-sectional view showing the pixel region of the liquid crystal display device according to the third embodiment of the present invention.

FIG. 11 is a plan view showing a pixel region on a TFT substrate of a liquid crystal display device according to a third embodiment of the present invention, and FIG. 12 is a plan view showing color filters formed on a counter substrate side of the liquid crystal display device according to the third embodiment of the present invention. FIG. 13 is a cross-sectional view of the liquid crystal display device taken along the V—V line in FIG. 11.

In the liquid crystal display device of this embodiment, the structure from the first substrate 1 to the protective insulating film 11 is configured as similar to the first embodiment except the interconnection on the same layer as the gate bus lines 2 and the shapes and locations of the contact holes.

Firstly, the structure on the first substrate 1 constituting the TFT substrate will be described.

On each of the first to third picture element regions $A_1$, $A_2$, and $A_3$ of the protective insulating film 11, a first picture element electrode 33a, 33d or 33g, a second picture element electrode 33b, 33e or 33h, and a third picture element electrode 33c, 33f or 33i are formed serially with intervals in the x direction. The first to third picture element electrodes 33a to 33i are made of a transparent conductive material such as ITO in a thickness of 70 nm, for example. Alternatively, in the case of a reflective liquid crystal display device, aluminum is used for the picture element electrodes.

In the first picture element region $A_1$, the first picture element electrode 33a is connected at a bottom part to the source electrode 8s of the TFT 10 through the contact hole 11a of the protective insulating film 11. Meanwhile, in the second picture element region $A_2$, the second picture element electrode 33e is connected at a bottom part to the source electrode 8s of the TFT 10 through the contact hole 11b of the protective insulating film 11. Moreover, in the third picture element region $A_3$, the third picture element electrode 33i is connected at a bottom part to the source electrode 8s of the TFT 10 through the contact hole 11c of the protective insulating film 11.

Here, in the second picture element region $A_2$, the source electrode 8s of the TFT 10 has a sufficient length for reaching under the second picture element electrode 33e. Meanwhile, in the third picture element region $A_3$, the source electrode 8s of the TFT 10 has a sufficient length for reaching under the third picture element electrode 33i.

In the first to third picture element regions $A_1$, $A_2$, and $A_3$, the first picture element electrodes 33a, 33d, and 33g are electrically connected to one another through a first interconnection 34a. Meanwhile, the second picture element electrodes 33b, 33e, and 33h are electrically connected to one another through a second interconnection 34b. Moreover, the third picture element electrodes 33c, 33f, and 33i are electrically connected to one another through a third interconnection 34c.

The first, second, and third interconnections 34a, 34b, and 34c are formed lengthwise in the x direction on the first substrate 1 with intervals in the y direction. Note that the first, second, and third interconnections 34a, 34b, and 34c are formed of the conductive film having the same structure as the gate electrodes 3 and the gate bus lines 2.

The first interconnection 34a is formed in a range from a position under the third picture element electrode 33c of the first picture element region $A_1$ to a position under the third picture element electrode 33i of the third picture element region $A_3$. Meanwhile, the second interconnection 34b is formed in a range from a position under the second picture element electrode 33b of the first picture element region $A_1$ to a position under the second picture element electrode 33h of the third picture element region $A_3$. Moreover, the third interconnection 34c is formed in a range from a position under the first picture element electrode 33a of the first picture element region $A_1$ to a position under the first picture element electrode 33g of the third picture element region $A_3$.

In the meantime, the first interconnection 34a electrically connects the third picture element electrodes 33c, 33f, and 33i in the first to third picture element regions $A_1$, $A_2$, and $A_3$ through first to third contact holes 35a to 35c which are formed through the gate insulating film 4 and the protective insulating film 11. Meanwhile, the second interconnection 34b electrically connects the second picture element electrodes 33b, 33e, and 33h in the first to third picture element regions $A_1$, $A_2$, and $A_3$ through fourth to sixth contact holes 35d to 35f which are formed through the gate insulating film 4 and the protective insulating film 11. Moreover, the third interconnection 34c electrically connects the first picture element electrodes 33a, 33d, and 33g in the first to third picture element regions $A_1$, $A_2$, and $A_3$ through seventh to ninth contact holes 35g to 35i which are formed through the gate insulating film 4 and the protective insulating film 11.

Note that the picture element electrodes 33a to 33i and the protective insulating film 11 are covered with the first alignment film 14 as similar to the first embodiment.

Next, a layer structure on the second substrate 20 being the counter substrate will be described.

A black matrix 36 made of a light shielding film such as Cr is formed on the second substrate 20 which is made of a light transmitting insulative material such as glass, vitreous silica or a plastic film. Apertures 36a to 36c are formed in regions of the black matrix 36 facing the above-described picture element regions $A_1$, $A_2$, and $A_3$ by use of a photolithography method. The black matrix 36 is formed into the shape so as to cover the active layers 5 of the TFTs 10 and to define the picture element regions $A_1$, $A_2$, and $A_3$.

A first red filter 37R facing the first picture element electrode 33a, a first green filter 37G facing the second picture element electrode 33b, and a first blue filter 37B facing the third picture element electrode 33c are formed inside the aperture 36a of the light shielding film 36 in the first picture element region $A_1$ on the second substrate 20. Similarly, a second red filter 38R facing the first picture element electrode 33d, a second green filter 38G facing the second picture element electrode 33e, and a second blue filter 38B facing the third picture element electrode 33f are formed inside the second aperture 36b of the light shielding film 36 in the second picture element region $A_2$. Moreover, a third red filter 39R facing the first picture element electrode 33g, a third green filter 39G facing the second picture element electrode 33h, and a third blue filter 39B facing the third picture element electrode 33i are formed inside the third aperture 36c of the light shielding film 36 in the third picture element region $A_3$.

Here, in the respective picture element regions $A_1$, $A_2$, and $A_3$, the filters 37R, 37G, 37B, 38R, 38G, 38B, 39R, 39G, and 39B which are adjacent to each other and have different colors are overlapped. In the structure of overlapping the filters of different colors, a portion where the filters are overlapped functions as a light shielding film. Accordingly, it is not necessary to dispose the black matrix at that portion. Alternatively, in a structure where the filters which are adjacent to each other and have different colors are not overlapped, the black matrix 36 is disposed on a boundary of the filters.

A light transmitting conductive film such as ITO is formed on the filters 37R, 37G, 37B, 38R, 38G, 38B, 39R, 39G, and 39B and on the black matrix 36 as the counter electrode 25. Moreover, the second alignment film 26 made of resin is formed on the counter electrode 25.

Figure 14:
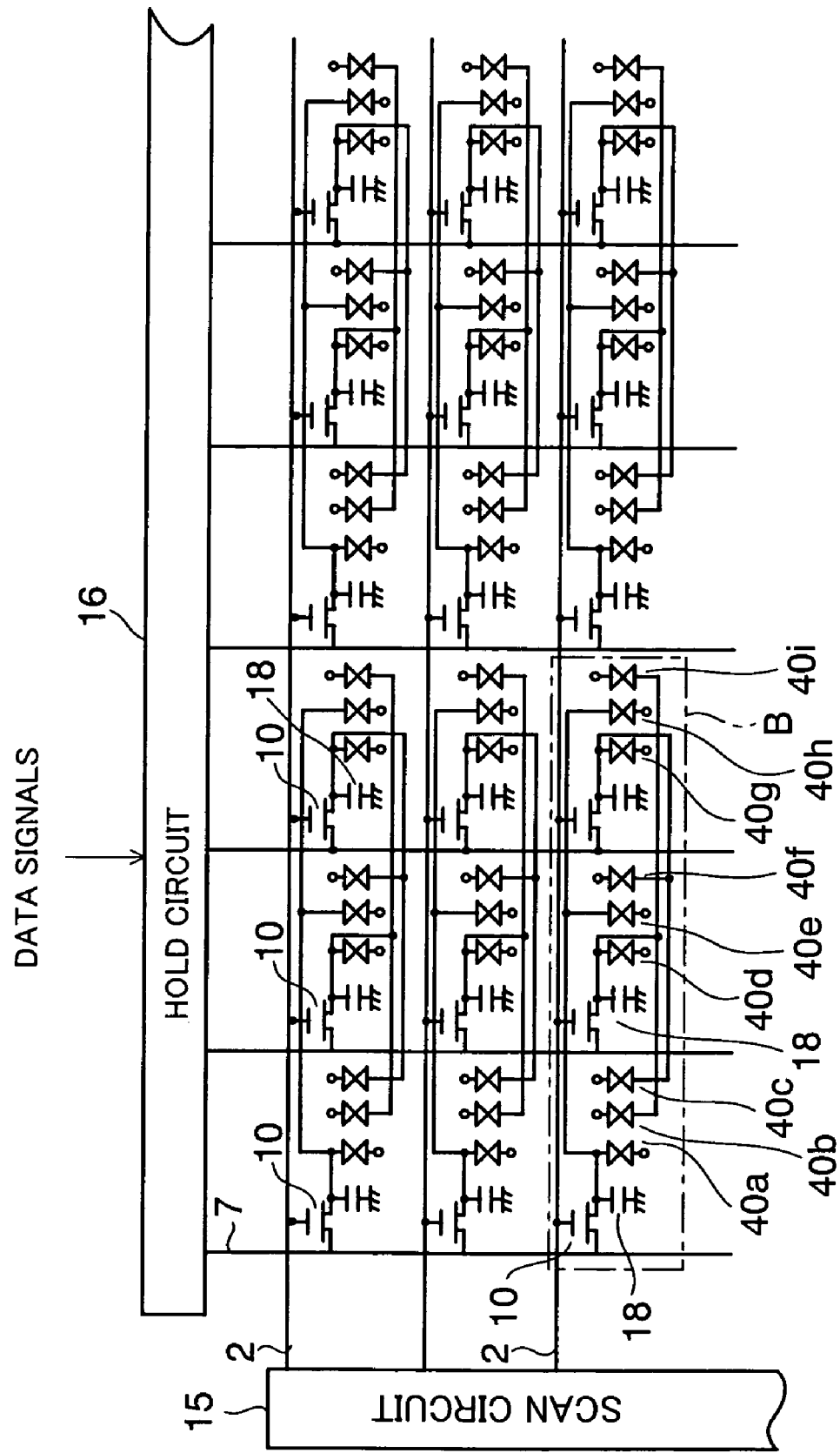
FIG. 14 is a circuit diagram of the liquid crystal display device according to the third embodiment of the present invention.

The above-described gate bus lines 2, the drain bus lines 7, and the TFTs 10 are connected to peripheral circuits as shown in the circuit diagram of FIG. 14. The plurality of gate bus lines 2 are connected to the scan circuit 15. Meanwhile, the plurality of drain bus lines 7 are connected to the hold circuit 16 to which data signals are transmitted. Moreover, as described above, the gate electrodes 3 of the TFTs 10 are connected to the gate bus lines 2 and the drain electrodes 8d of the TFTs 10 are connected to the drain bus lines 7. Furthermore, liquid crystal cells 17 including the picture element electrodes 33a to 33i, the counter electrode 25, and the liquid crystal 19, and the auxiliary capacitors 18 are connected to the source electrodes 8s of the TFTs 10.

The first substrate 1 and the second substrate 20 having the above-described structures are fixed in a state where the first alignment film 14 and the second alignment film 26 are opposed to each other with provision of an interval. Moreover, the liquid crystal 19 is filled between the first alignment film 14 and the second alignment film 26.

In the above-described liquid crystal display device, a vertical alignment liquid crystal material with negative dielectric anisotropy is used as the liquid crystal 19, for example.

Moreover, when the TFT 10 inside the first picture element region $A_1$ is turned on in response to signals from the gate bus line 2 and the drain bus line 7, voltages at the first picture element electrodes 33a, 33d, and 33g inside the first to third picture element regions $A_1$ to $A_3$ change and thereby drive liquid crystal molecules thereon. Accordingly, light from outside passes through the first picture element electrodes 33a, 33d, and 33g, the liquid crystal 19, and the red filters 37R, 38R, and 39R, and the red color is displayed partially in the first to third picture element regions $A_1$, $A_2$, and $A_3$.

Similarly, when the TFT 10 inside the second picture element region $A_2$ is turned on, voltages at the second picture element electrodes 33b, 33e, and 33h respectively facing to the green filters 37G, 38G, and 39G change and thereby drive liquid crystal 19 thereon. Accordingly, the light which is incident on the second picture element electrodes 33b, 33e, and 33h passes through the liquid crystal 19 and the green filters 37G, 38G, and 39G. In this way, the green color is displayed partially in the first to third picture element regions $A_1$, $A_2$, and $A_3$.

Moreover, when the TFT 10 inside the third picture element region $A_3$ is turned on, voltages at the third picture element electrodes 33c, 33f, and 33i respectively facing to the blue filters 37B, 38B, and 39B change and thereby drive liquid crystal 19 thereon. Accordingly, the light which is incident on the third picture element electrodes 33c, 33f, and 33i passes through the liquid crystal 19 and the blue filters 37B, 38B, and 39B. In this way, the blue color is displayed partially in the first to third picture element regions $A_1$, $A_2$, and $A_3$.

The light which passed through the red, blue, and green filters 37R, 37G, 37B, 38R, 38G, 38B, 39R, 39G, and 39B disposed severally in the three picture element regions $A_1$, $A_2$, and $A_3$ in each pixel region B is mixed in each pixel region B and thereby forms a designated color. Luminance of the respective colors of red, green, and blue in each region changes in accordance with the voltages on the drain bus lines 7.

According to this embodiment, in the pixel region B, not only the filters in different colors but also the filters of the same colors such as filters 37R, 37G, 37B, 38R, 38G, 38B, 39R, 39G, and 39B are spatially separated and divided, and are then mixed together in one unit. Such mixture of the colors effectuates full-color display.

Therefore, single colors in the picture element regions become inconspicuous and coarseness of image quality is substantially improved as similar to the first embodiment. In particular, the red filters 37R, 38R, and 39R, the green filters 37G, 38G, and 39G, and the blue filters 37B, 38B, and 39B are severally separated and divided into three pieces and the filters in the respective colors are spatially dispersed. Accordingly, as compared to the conventional structure of arranging one filter in one picture element region, it is possible to improve coarseness of image quality attributable to the sizes of the filters in the respective colors down to one-third.

Moreover, according to this embodiment, the filters in the plurality of colors are disposed in each of the picture element regions $A_1$, $A_2$, and $A_3$. In addition, the plurality of picture element electrodes 33a to 33i which face the plurality of filters of the same colors, such as the filters 37R, 38R, and 39R, the filters 37G, 38G, and 39G, or the filters 37B, 38B, and 39B, are electrically connected together through the interconnections 34a, 34b, and 34c disposed therebelow.

Therefore, without increasing the number of the TFTs 10 and the bus lines 2 and 7, regions of the plurality of red filters 37R, 38R, and 39R, the plurality of green filters 37G, 38G, and 39G, and the plurality of blue filters 37B, 38B, and 39B all of which are spatially separated in the pixel region B can be severally driven by the same number of the TFTs (the active elements) 10 as before. Accordingly, it is possible to display high quality image.

As a result, it is not necessary to increase the number of the active elements or the bus lines. Accordingly, it is possible to avoid reduction in yields or complexity of structures.

Here, it is also possible to adopt the structure to be described in the subsequent fourth embodiment as the color filters.

Fourth Embodiment

In the third embodiment, the set of the first picture element electrodes 33a, 33d, and 33g severally disposed in the three picture element regions $A_1$, $A_2$, and $A_3$ which constitute each pixel of the liquid crystal display device are electrically connected together through the third interconnection 34c. In the meantime, the set of the second picture element electrodes 33b, 33e, and 33h are electrically connected together through the second interconnection 34b, and the set of the third picture element electrodes 33c, 33f, and 33i are electrically connected together through the first interconnection 34a.

In this embodiment, description will be made on a structure in which the set of the first picture element electrodes 33a, 33d, and 33g, the set of the second picture element electrodes 33b, 33e, and 33h, and the set of the third picture element electrodes 33c, 33f, and 33i are directly connected without using the additional interconnection as similar to the second embodiment.

Figure 15:
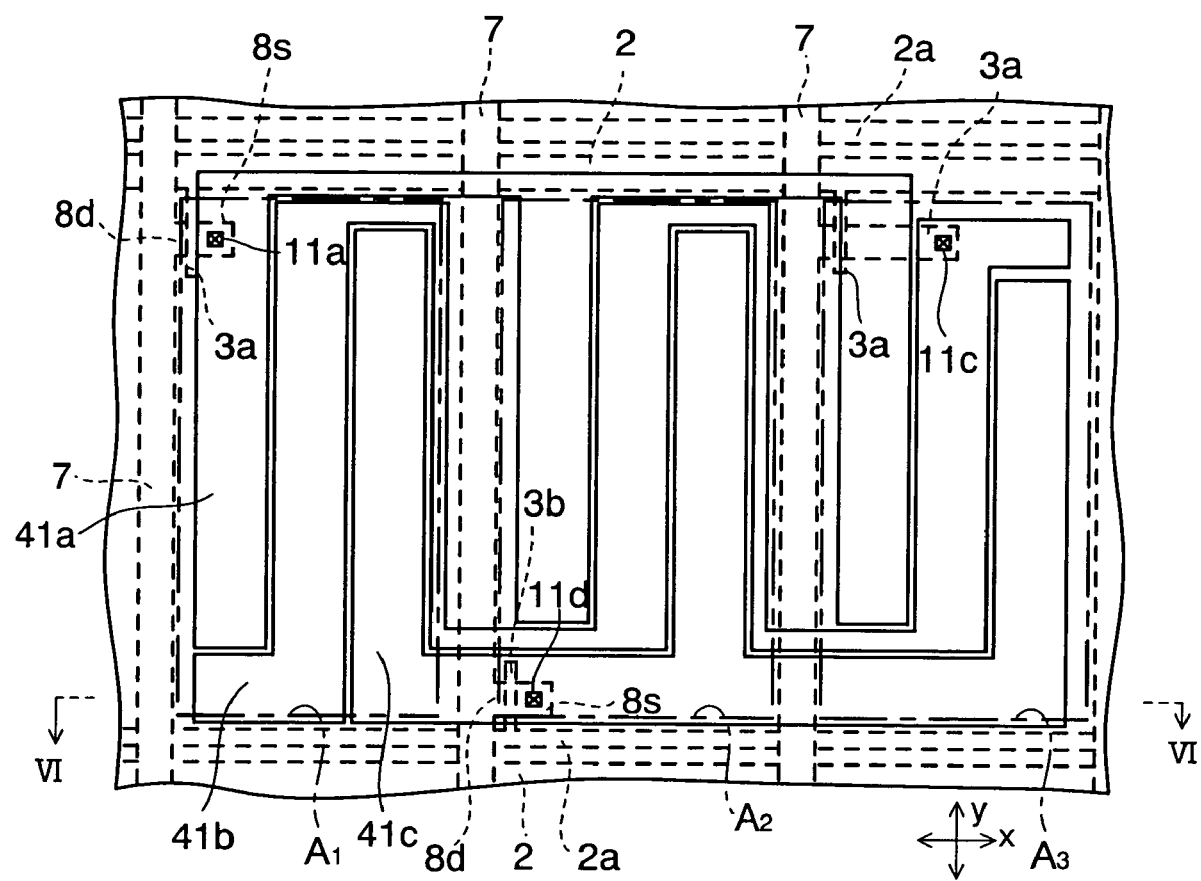
FIG. 15 is a plan view showing a pixel region on a TFT substrate of a liquid crystal display device according to a fourth embodiment of the present invention.
Figure 16:
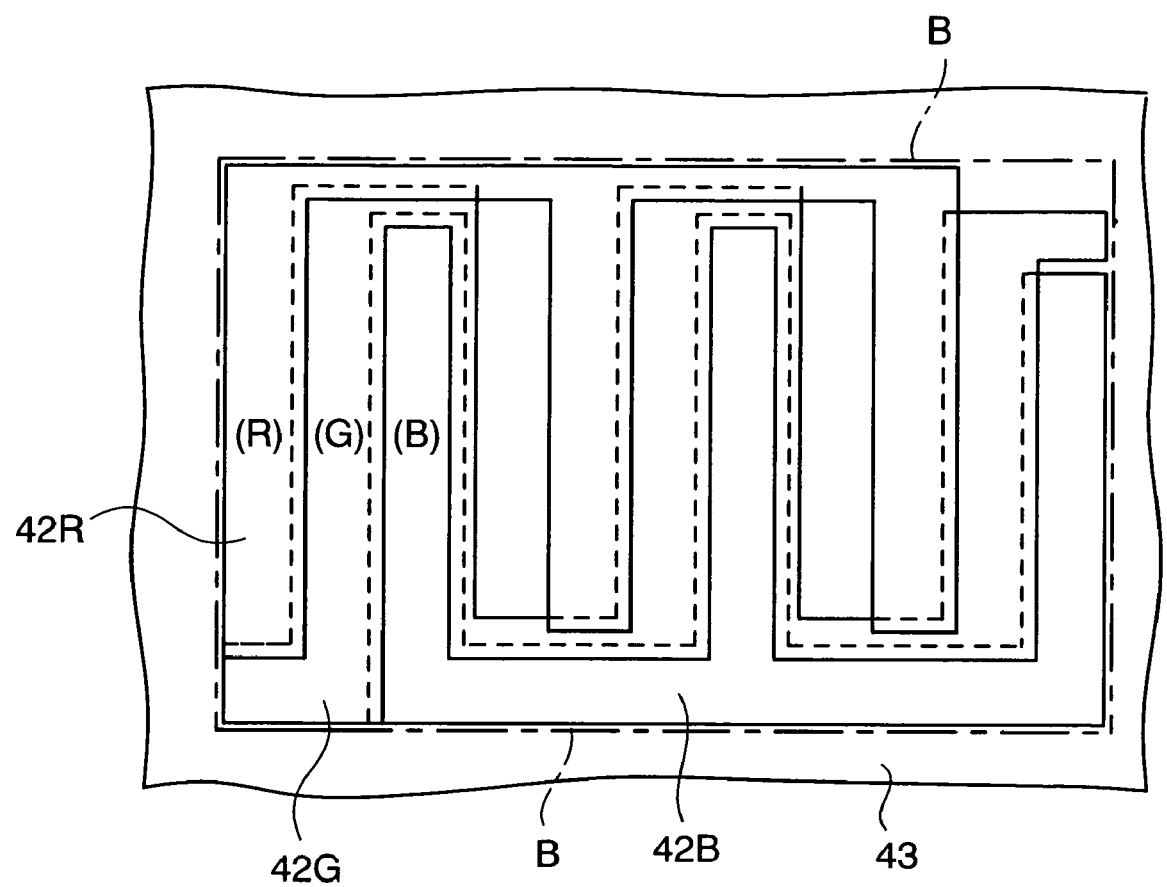
FIG. 16 is a plan view showing color filters formed on a counter electrode side of the liquid crystal display device according to the fourth embodiment of the present invention.
Figure 17:
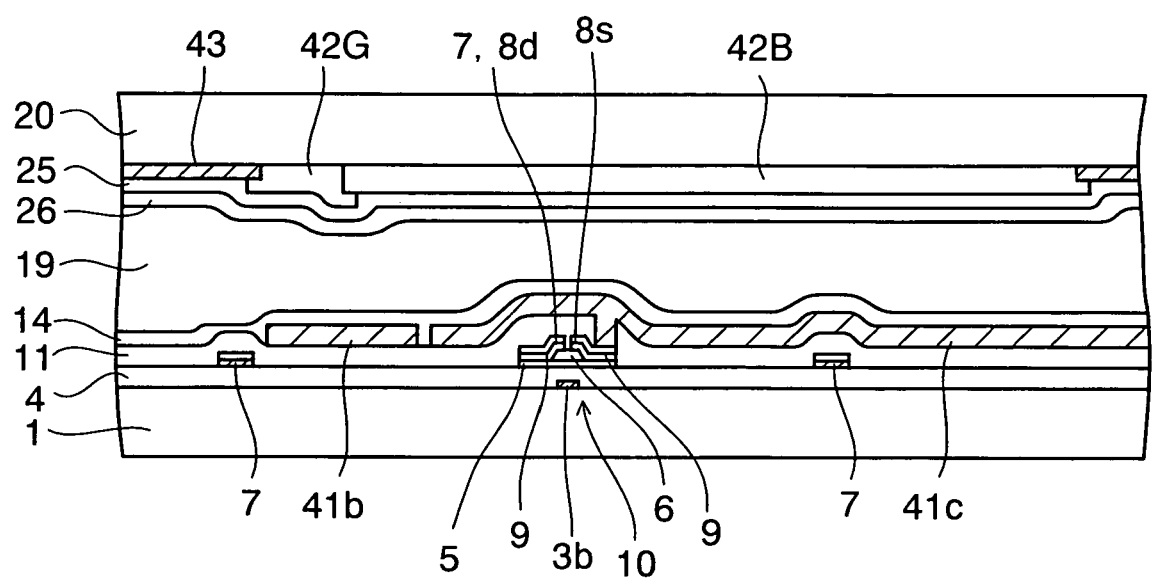
FIG. 17 is a cross-sectional view showing the pixel region of the liquid crystal display device according to the fourth embodiment of the present invention.

FIG. 15 is a plan view showing a pixel region on a TFT substrate of a liquid crystal display device according to a fourth embodiment of the present invention, and FIG. 16 is a plan view showing color filters formed on a counter electrode side of the liquid crystal display device according to the fourth embodiment of the present invention. FIG. 17 is a cross-sectional view of the liquid crystal display device taken along the VI—VI line in FIG. 15.

Note that FIG. 16 is the plan view which is viewed from a side of the substrate where the color filters and the black matrix are not formed thereon.

Gate bus lines 2 and sub-gate bus lines 2a for defining the picture element regions $A_1$, $A_2$, and $A_3$ in the y direction are formed directly or through an insulating film on the first substrate 1 which is made of a light transmitting insulative material such as glass, vitreous silica or a plastic film. The plurality of gate bus lines 2 and the sub-gate bus lines 2a are alternately disposed in the y direction.

The gate bus line 2 and the sub-gate bus line 2a for defining a row of the picture element regions $A_1$, $A_2$, and $A_3$ are connected to the scan circuit 15 shown in FIG. 14, and the same signal is applied thereto.

Here, a gate electrode 3a is formed at a first corner portion in each of the first and third picture element regions $A_1$ and $A_3$ so as to protrude from the gate bus line 2 in the y direction. Meanwhile, a gate electrode 3b is formed at a second corner portion, which is present in the y direction from the first corner in the second picture element region $A_2$, so as to protrude from the sub-gate bus line 2a in the y direction.

The first substrate 1, the gate bus lines 2, the sub-gate bus lines 2a, and the gate electrodes 3a and 3b are covered with the gate insulating film 4 as similar to the first embodiment On the gate insulating film 4, active layers 5 made of undoped amorphous silicon are formed over the gate electrodes 3a and 3b, and in the periphery thereof, into approximately rectangular planar shapes as similar to the first embodiment. Moreover, channel protective insulating films 6 are formed into island shapes over the gate electrodes 3a and 3b on the active layers 5 as similar to the first embodiment.

Moreover, the plurality of drain bus lines 7 extending in the y direction for defining the picture element regions $A_1$, $A_2$, and $A_3$ are formed on the gate insulating film 4 with intervals as similar to the first embodiment.

At portions of the drain bus line 7 close to intersections with the gate bus line 2, the drain electrodes 8d protrude toward the gate electrodes 3a and 3b. Each of the drain electrodes 8d is formed above the active layer 5 on one side of the channel protective insulating film 6 through a contact layer 9. Moreover, the source electrode 8s is formed above each of the active layers 5 on the other side of the channel protective insulating film 6 through the contact layer 9. The drain electrode 8d and the source electrode 8s are separated together with the contact layers 9 therebelow on the channel protective layer 6 by a slit.

The drain electrode 8d, the source electrode 8s, the gate insulating film 4, and the active layer 5 collectively constitute the thin film transistor (TFT) 10.

The drain bus lines 7 and the TFTs 10 are covered with the protective insulating film 11 made of either silicon oxide or silicon nitride.

On the protective insulating film 11, first to third picture element electrodes 41a, 41b, and 41c are formed in each pixel region B. The first to third picture element electrodes 41a, 41b, and 41c are formed into shapes detouring within the first to third picture element regions $A_1$, $A_2$, and $A_3$ so as not to contact one another.

The first picture element electrode 41a has an approximately E-shape which is disposed in part of the first to third picture element regions $A_1$, $A_2$, and $A_3$ through bridge portions along the gate bus line 2 and bridge portions crossing the drain bus lines 7. The first picture element electrode 41a is connected to the source electrode 8s of the TFT 10 in the first picture element region $A_1$ through the contact hole 11a. The TFT 10 in the second picture element region $A_2$ has a cross-sectional shape as shown in FIG. 17, and the TFTs 10 in the first and third picture element regions $A_1$ and $A_3$ have the cross-sectional shape which is similar to the first embodiment.

The third picture element electrode 41c has an approximately E-shape which is disposed in part of the first to third picture element regions $A_1$, $A_2$, and $A_3$ through bridge portions along the sub-gate bus line 2a and bridge portions crossing the drain bus lines 7. The third picture element electrode 41c is connected to the source electrode 8s of the TFT 10 in the third picture element region $A_3$ through the contact hole 11c.

The first picture element electrode 41a is disposed in a region within the first to third picture element regions $A_1$, $A_2$, and $A_3$, which is close to the drain bus line 7 to be connected to the TFT 10. Meanwhile, the third picture element electrode 41c is disposed in a region within the first to third picture element regions $A_1$, $A_2$, and $A_3$, which is away from the TFT 10.

The second picture element electrode 41b has an integrated shape to be disposed in part of the first to third picture element regions $A_1$, $A_2$, and $A_3$ in a meandering manner through bridge portions crossing the drain bus lines 7. The second picture element electrode 41b is connected to the source electrode 8s of the TFT 10 in the second picture element region $A_2$ through the contact hole 11b.

The first to third picture element electrodes 41a to 41c are made of a transparent conductive material such as ITO in a thickness of 70 nm, for example. Alternatively, in the case of a reflective liquid crystal display device, aluminum is used for the picture element electrodes 41a to 41c.

The above-described picture element electrodes 41a to 41c, and the protective insulating film 11 are covered with the first alignment film 14 made of resin.

Next, the second substrate 20 and a layer structure thereon will be described.

Color filters 42R, 42G, and 42B to be formed on the second substrate 20 have the shapes so as to face the first to third picture element electrodes 41a to 41c. For example, as shown in FIG. 16, the red filter 42R has a planar shape of an approximately E-shape facing the first picture element electrode 41a, the green filter 42G has a planar shape of a meandering shape facing the second picture element electrode 41b, and the blue filter 42B has a planar shape of an approximately E-shape facing the third picture element electrode 41c. The red filter 42R, the green filter 42G, and the blue filter 42B overlap one another at respective boundary portions to constitute light shielding regions. However, it is also possible to configure the color filters not to overlap one another.

A black matrix 43 made of a light shielding film having apertures in positions facing to the picture element regions is formed on the second substrate 20 in the periphery of the filters 42R, 42G, and 42B.

A light transmitting conductive film such as ITO is formed on the red filter 42R, the green filter 42G, the blue filter 42B, and the black matrix 43 as the counter electrode 25. Moreover, a second alignment film 26 made of resin is formed on the counter electrode 25.

Here, it is also possible to use the filters of the same shapes as shown in FIG. 12 concerning the third embodiment as the color filters on the second substrate 20.

The above-described picture element electrodes 41a to 41c, and the red, green, and blue filters 42R, 42G, and 42B are spatially dispersed in the pixel region B as similar to the third embodiment. Accordingly, the color filters in three colors become inconspicuous even when the picture element regions grow in size such as in a case of a display panel for a large-size television. As a result, image quality is substantially improved.

In addition, one picture element electrode is dispersed into three positions in the plurality of picture element regions in response to the dispersed red, green, and blue filters 42R, 42G, and 42B. Accordingly, the number of the TFTs 10 is not increased. In this case, the dispersed picture element electrodes 41a to 41c are two-dimensionally connected together on the protective insulating film 11 unlike the third embodiment, and it is therefore necessary to devise the planar shapes. However, a new process will not be added to the conventional pixel formation process.

Fifth Embodiment

A fifth embodiment of the present invention will be described below. In the first to fourth embodiments, one pixel includes three color elements of red (R), green (G), and blue (B). In this embodiment, one pixel includes four color elements of red (R), green (G), blue (B), and white (W).

Figure 18:
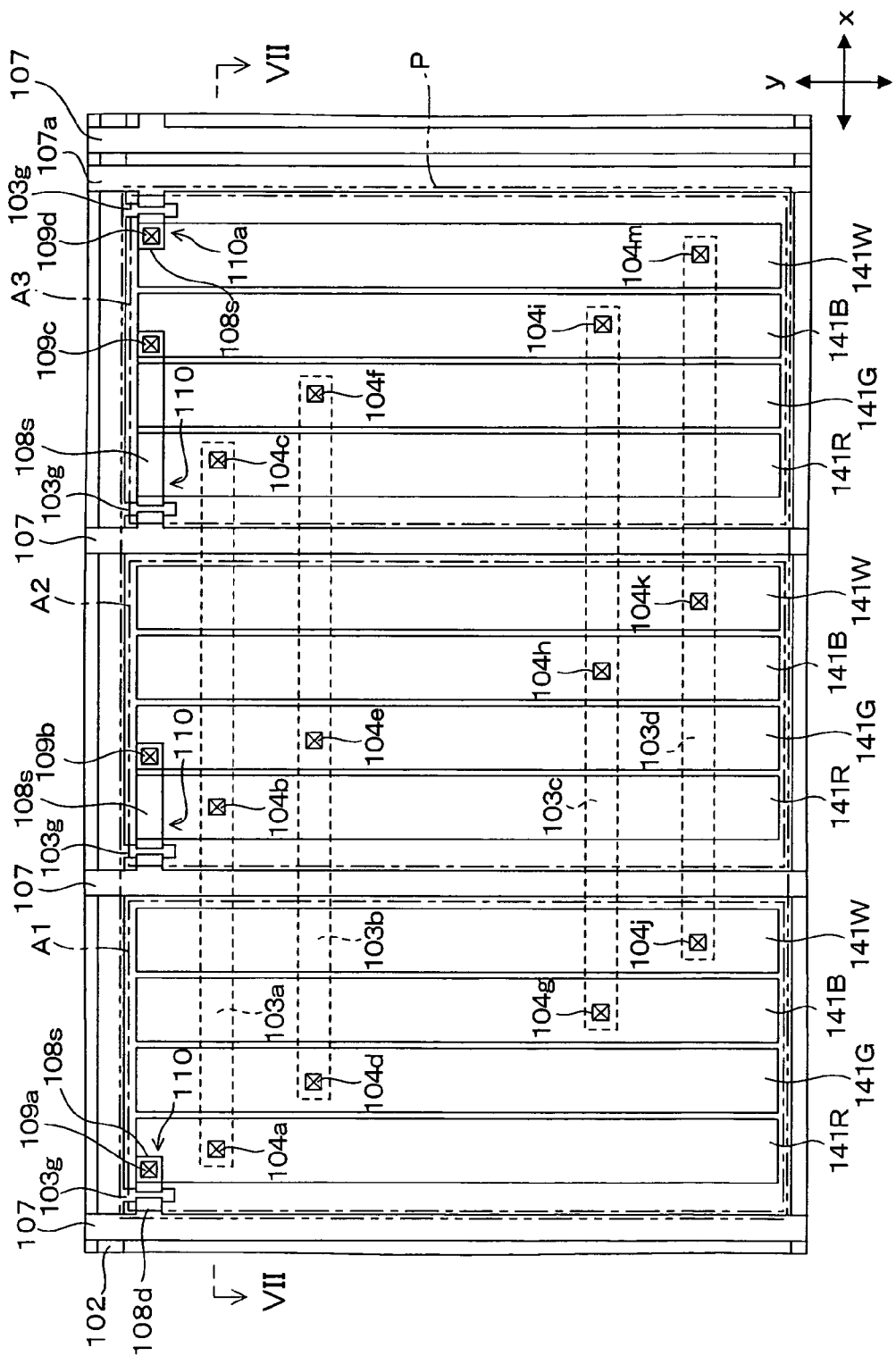
FIG. 18 is a plan view showing a pixel region on a TFT substrate of a liquid crystal display device according to a fifth embodiment of the present invention.

FIG. 18 is a plan view showing a pixel region on a TFT substrate of a liquid crystal display device according to a fifth embodiment of the present invention.

As similar to the first embodiment, gate bus lines 102 extending in the x direction and first drain bus lines 107 extending in the y direction are formed on one of substrates (the TFT substrate). Each rectangular region defined by these gate bus lines 102 and the first drain bus lines 107 constitutes a picture element region. Moreover, three picture element regions (a first picture element region $A_1$, a second picture element region $A_2$, and a third element region $A_3$) which are adjacent along the x direction collectively constitute one pixel region P.

In this embodiment, a second drain bus line 107a extending in parallel to the first drain bus line 107 is formed on the right side of the third picture element region $A_3$. Moreover, four picture element electrodes 141R, 141G, 141B, and 141W are arranged in the x direction in each of the first to third picture element electrodes $A_1$, $A_2$, and $A_3$.

In each of the first to third picture element electrodes $A_1$, $A_2$, and $A_3$, a TFT 110 is formed in the vicinity of an intersection of the gate bus line 102 and the first drain bus line 107. Meanwhile, a TFT 110a is formed in the vicinity of an intersection of the gate bus line 102 and the second drain bus line 107a.

A gate electrode 103g of the TFT 110 is connected to the gate bus line 102, and a drain electrode 108d thereof is connected to the first drain bus line 107. A source electrode 108s of the TFT 110 in the first picture element region $A_1$ is electrically connected to the picture element electrode 141R in the first picture element region $A_1$ through a contact hole 109a. A source electrode 108s of the TFT 110 in the second picture element region $A_2$ is electrically connected to the picture element electrode 141G in the second picture element region $A_2$ through a contact hole 109b. The TFT 110 in the third picture element region $A_3$ is electrically connected to the picture element electrode 141B in the third picture element region $A_3$ through a contact hole 109c. Moreover, the TFT 110a in the third picture element region $A_3$ is electrically connected to the picture element electrode 141W in the third picture element region $A_3$ through a contact hole 109d.

The picture element electrodes 141R respectively disposed in the first to third picture element regions $A_1$, $A_2$, and $A_3$ are electrically connected to one another through a first interconnection 103a formed therebelow and through contact holes 104a, 104b, and 104c. Meanwhile, the picture element electrodes 141G respectively disposed in the first to third picture element regions $A_1$, $A_2$, and $A_3$ are electrically connected to one another through a second interconnection 103b formed therebelow and through contact holes 104d, 104e, and 104f. Moreover, the picture element electrodes 141B respectively disposed in the first to third picture element regions $A_1$, $A_2$, and $A_3$ are electrically connected to one another through a third interconnection 103c formed therebelow and through contact holes 104g, 104h, and 104i. Furthermore, the picture element electrodes 141W respectively disposed in the first to third picture element regions $A_1$, $A_2$, and $A_3$ are electrically connected to one another through a fourth interconnection 103d formed therebelow and through contact holes 104j, 104k, and 104m.

Figure 19:
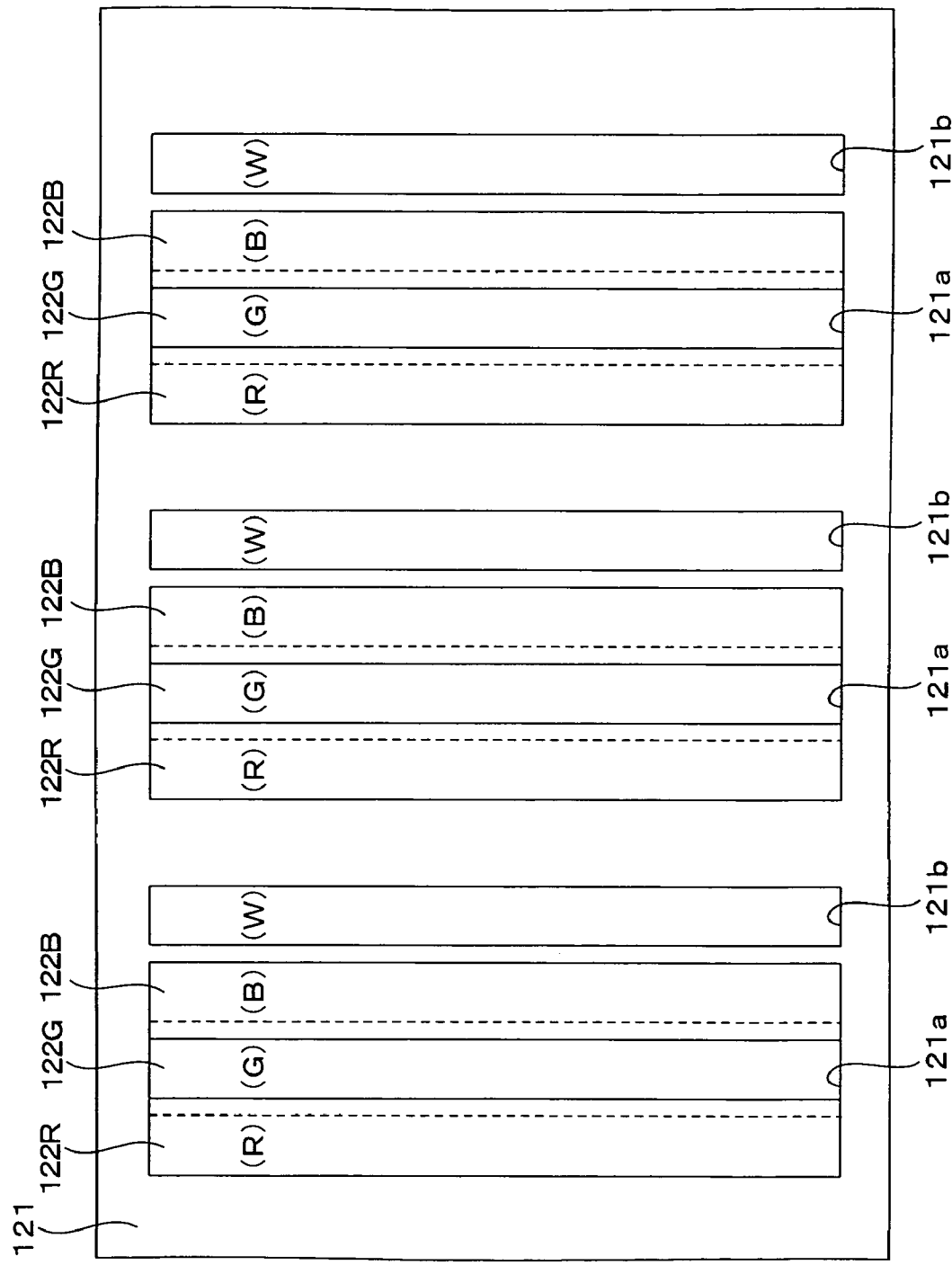
FIG. 19 is a plan view showing color filters and a black matrix formed on a counter substrate side according to the fifth embodiment of the present invention.
Figure 20:
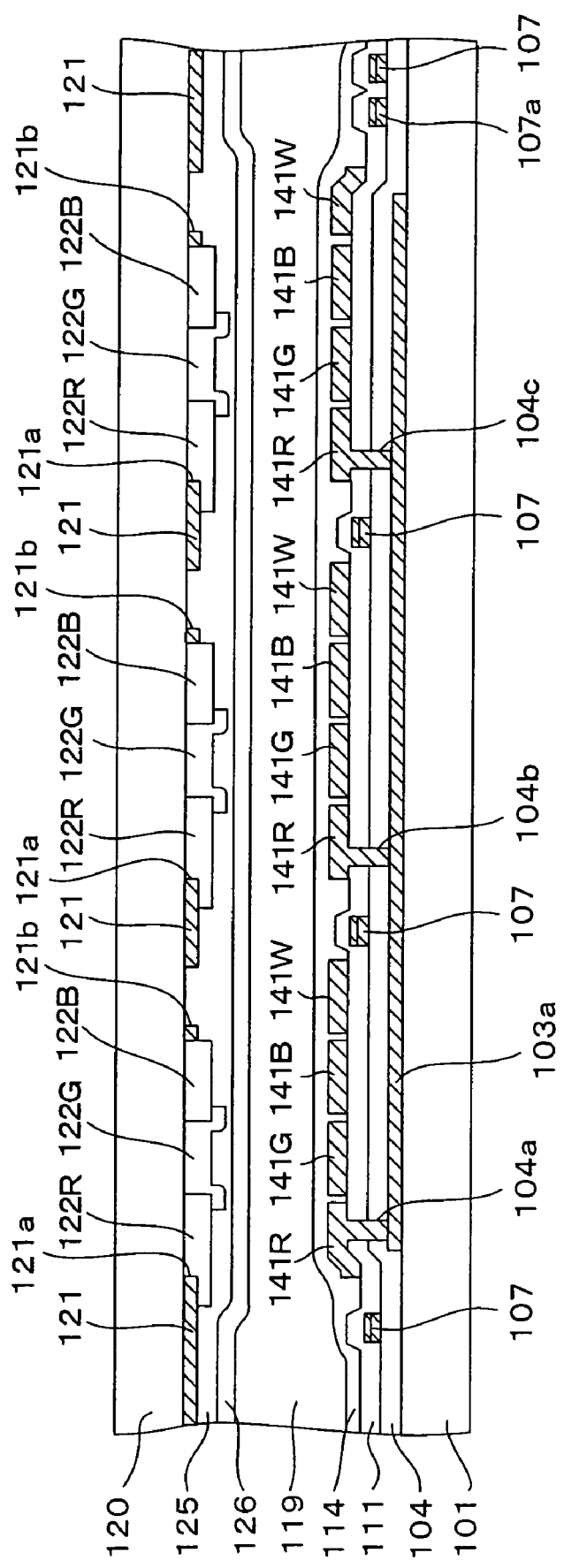
FIG. 20 is a cross-sectional view of the liquid crystal display device taken along the VII—VII line in FIG. 18.

FIG. 19 is a plan view showing color filters formed on a counter substrate side according to the fifth embodiment of the present invention. FIG. 20 is a cross-sectional view of the liquid crystal display device taken along the VII—VII line in FIG. 18. Note that FIG. 19 is the plan view which is viewed from a side of the substrate where the color filters and the black matrix are not formed thereon.

Firstly, a layer structure of a first substrate 101 (the TFT substrate) will be described with reference to FIG. 18 and FIG. 20.

The gate bus lines 102, the gate electrodes 103g of the TFTs 110 and 110a, and the first to fourth interconnections 103a to 103d are formed on the first substrate 101 which is made of a light transmitting insulative material such as glass, vitreous silica or a plastic film. These gate bus lines 102, the gate electrodes 103g of the TFTs 110 and 110a, and the first to fourth interconnections 103a to 103d are covered with a gate insulating film 104 as similar to the first embodiment.

The first drain bus lines 107 and the second drain bus lines 107a are formed on the gate insulating film 104. Meanwhile, a semiconductor layer (not shown) constituting an active layer of each of the TFTs 110 and 110a is formed on a predetermined region of the gate insulating film 104 as similar to the first embodiment, and a channel protective insulating film (not shown) is formed on this semiconductor layer. The source electrodes 108s and the drain electrodes 108d of the TFTs 110 and 110a are formed on the semiconductor layer and the channel protective insulating film. The drain electrodes 108d of the TFTs 110 are connected to the first drain bus lines 107 and the drain electrodes 108d of the TFTs 110a are connected to the second drain bus lines 107a.

These TFTs 110 and 110a, and the drain bus lines 107 and 107a are covered with a protective insulating film 111 which is made of silicon oxide or silicon nitride.

On the protective insulating film 111, the first to fourth picture element electrodes 141R, 141G, 141B, and 141W are formed in each of the picture element regions $A_1$, $A_2$, and $A_3$.

As described previously, the picture element electrodes 141R respectively disposed in the first to third picture element regions $A_1$, $A_2$, and $A_3$ are connected to the first interconnection 103a through the contact holes 104a, 104b, and 104c which are formed through the protective insulating film 111 and the gate insulating film 104. Meanwhile, the picture element electrodes 141G respectively disposed in the first to third picture element regions $A_1$, $A_2$, and $A_3$ are connected to the second interconnection 103b through the contact holes 104d, 104e, and 104f which are formed through the protective insulating film 111 and the gate insulating film 104. Moreover, the picture element electrodes 141B respectively disposed in the first to third picture element regions $A_1$, $A_2$, and $A_3$ are connected to the third interconnection 103c through the contact holes 104g, 104h, and 104i which are formed through the protective insulating film 111 and the gate insulating film 104. Furthermore, the picture element electrodes 141W respectively disposed in the first to third picture element regions $A_1$, $A_2$, and $A_3$ are connected to the fourth interconnection 103d through the contact holes 104j, 104k, and 104m which are formed through the protective insulating film 111 and the gate insulating film 104.

These picture element electrodes 141R, 141G, 141B, and 141W are made of a transparent conductive material such as ITO in a thickness of 70 nm, for example. Alternatively, in the case of a reflective liquid crystal display device, the picture element electrodes 141R, 141G, 141B, and 141W are made of aluminum.

The picture element electrodes 141R, 141G, 141B, and 141W, and the protective insulating film 111 are covered with a first alignment film 114 which is made of resin such as polyimide.

Next, a second substrate (the counter substrate) and a layer structure thereon will be described with reference to FIG. 19 and FIG. 20.

On one of the surfaces of the second substrate 120, there is formed a black matrix 121 provided with apertures 121a and 121b in positions facing the picture element electrodes 141R, 141G, and 141B and in positions facing the picture element electrodes 141W, respectively. Red filters 122R are formed in the positions facing the picture element electrodes 141R in the respective picture element regions $A_1$, $A_2$, and $A_3$. Moreover, green filters 122G are formed in the positions facing the picture element electrodes 141G, and blue filters 122B are formed in the positions facing the picture element electrodes 141B. Meanwhile, color filters are not provided in the positions facing the picture element electrodes 141W. However, it is possible to form colorless films or neutral density filters in the positions facing the picture element electrodes 141W.

A light transmitting conductive film made of ITO or the like is formed on the red filters 122R, the green filters 122G, the blue filters 122B, and the apertures 121b as a counter electrode 125. Moreover, a second alignment film 126 made of resin such as polyimide is formed on the counter electrode 125.

The first substrate 101 and the second substrate 120 having the above-described structures are disposed in a state where the first alignment film 114 and the second alignment film 126 are opposed to each other. Moreover, liquid crystal 119 having negative dielectric anisotropy, for example, is filled between the first substrate 101 and the second substrate 120.

Figure 21:
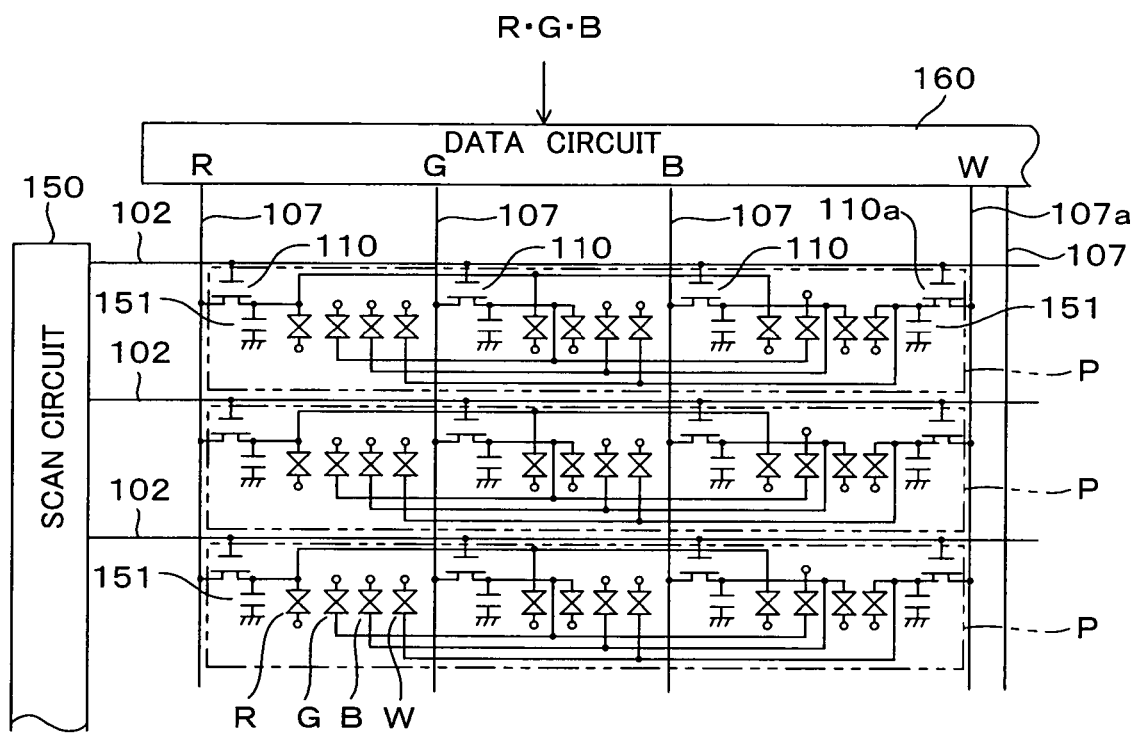
FIG. 21 is a drive circuit diagram of the liquid crystal device according to the fifth embodiment of the present invention.

FIG. 21 is a circuit diagram showing drive circuits of the liquid crystal display device of this embodiment. Here, in FIG. 21, auxiliary capacitors 151 are formed in spaces between the picture element electrodes 141R, 141G, 141B, and 141W, and unillustrated auxiliary capacitor bus lines (ground lines). Moreover, reference letters R, G, B, and W in the drawing denote liquid crystal cells (the color elements) of red, green, blue, and white, respectively, which are comprised of the picture element electrodes 141R, 141G, 141B, and 141W, the counter electrode 125, the color filters 122R, 122G, 122B, the apertures 121b, and the liquid crystal 119.

A data circuit 160 synthesizes a W signal by synthesizing an R signal, a G signal, and a B signal which are inputted from a device such as a television tuner. A method of synthesizing the W signal varies depending on required specifications. For example, the data circuit 160 calculates an average value of luminance components of the R signal, the G signal, and the B signal, and synthesizes the W signal by multiplying a result of the calculation by n (0 n 1).

The R signal, the G signal, the B signal, and the W signal outputted from the data circuit 160 are severally supplied to the corresponding drain bus lines 107 and 107a. Meanwhile, scan signals are outputted from a scan circuit 150 to the gate bus lines 120 at a given frequency. Then, the TFTs 110 and 110a connected to the gate bus lines 102, to which the scan signals are supplied, are turned on and the R signal, the G signal, the B signal, and the W signal are thereby supplied to the picture element electrodes 141R, 141G, 141B, and 141W, respectively. In this way, the red light, the green light, the blue light, and the white light which passing through the respective picture element regions $A_1$, $A_2$, and $A_3$ are mixed in the pixel region P, thus displaying a desired color.

In this embodiment, the same voltage (the R signal) is supplied to the picture element electrodes 141R dispersedly disposed in the picture element regions $A_1$, $A_2$, and $A_3$. Meanwhile, the same voltage (the G signal) is supplied to the picture element electrodes 141G dispersedly disposed in the picture element regions $A_1$, $A_2$, and $A_3$. Moreover, the same voltage (the B signal) is supplied to the picture element electrodes 141B dispersedly disposed in the picture element regions $A_1$, $A_2$, and $A_3$. Furthermore, the same voltage (the W signal) is supplied to the picture element electrodes 141W dispersedly disposed in the picture element regions $A_1$, $A_2$, and $A_3$. In other words, the color elements of red, green, blue, and white are spatially dispersed within one pixel region P. Accordingly, the respective color elements become inconspicuous even when the picture element regions grow in size such as in a case of a display panel for a large-size television. As a result, image quality is substantially improved as compared to a conventional liquid crystal display device.

Moreover, the four color elements of red, green, blue, and white in one pixel region P are driven by four TFTs. Accordingly, it is necessary to increase just one TFT for each pixel region as compared to the conventional liquid crystal display device. Therefore, the increase in the number of the TFTs can be minimized.

Furthermore, in this embodiment, the white color element is added to the red, green, and blue color elements. Accordingly, this embodiment exerts effects to achieve high-contrast display with improved screen luminance and to white adjustment becomes easy.

Note that the picture element electrodes W are disposed severally in the three picture element regions $A_1$, $A_2$, and $A_3$ in the fifth embodiment. However, it is possible to dispose the picture element electrodes W in only one or two picture element regions out of these picture element regions $A_1$, $A_2$, and $A_3$. Moreover, it is possible to forth picture element region $A_4$ is added to one pixel region P, and a white color element (a gate bus line, a drain bus line, a TFT and a W electrode) dispose in the forth picture element region $A_4$.

Sixth Embodiment

A sixth embodiment of the present invention will be described below. In the first to fifth embodiments, the plurality of color filters in different colors are arranged in the lateral direction (the x direction) in each picture element region. In this embodiment, the plurality of color filters in different colors are arranged in the longitudinal direction (the y direction) in each picture element region.

Figure 22:
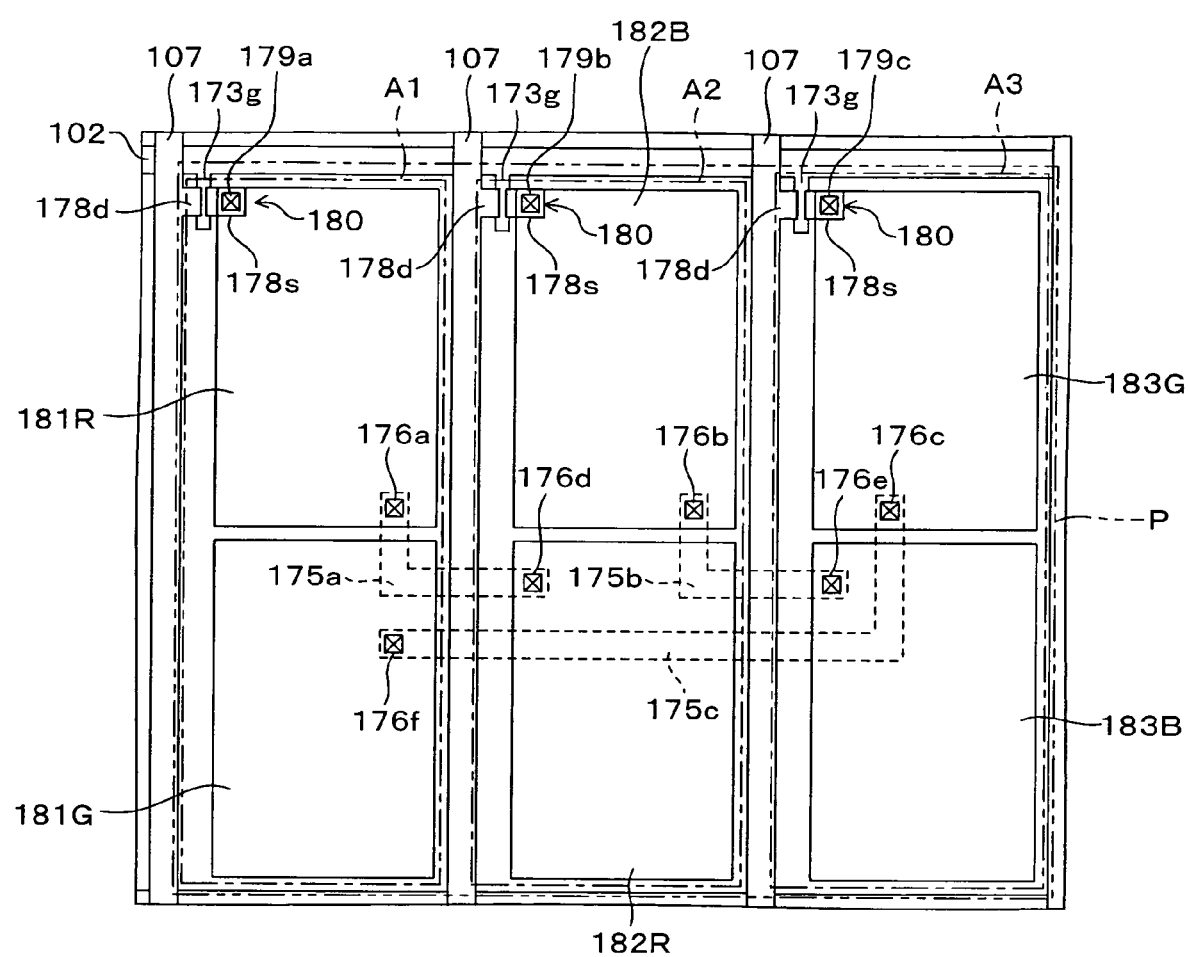
FIG. 22 is a plan view showing a pixel region on a TFT substrate of a liquid crystal display device according to a sixth embodiment of the present invention.
Figure 23:
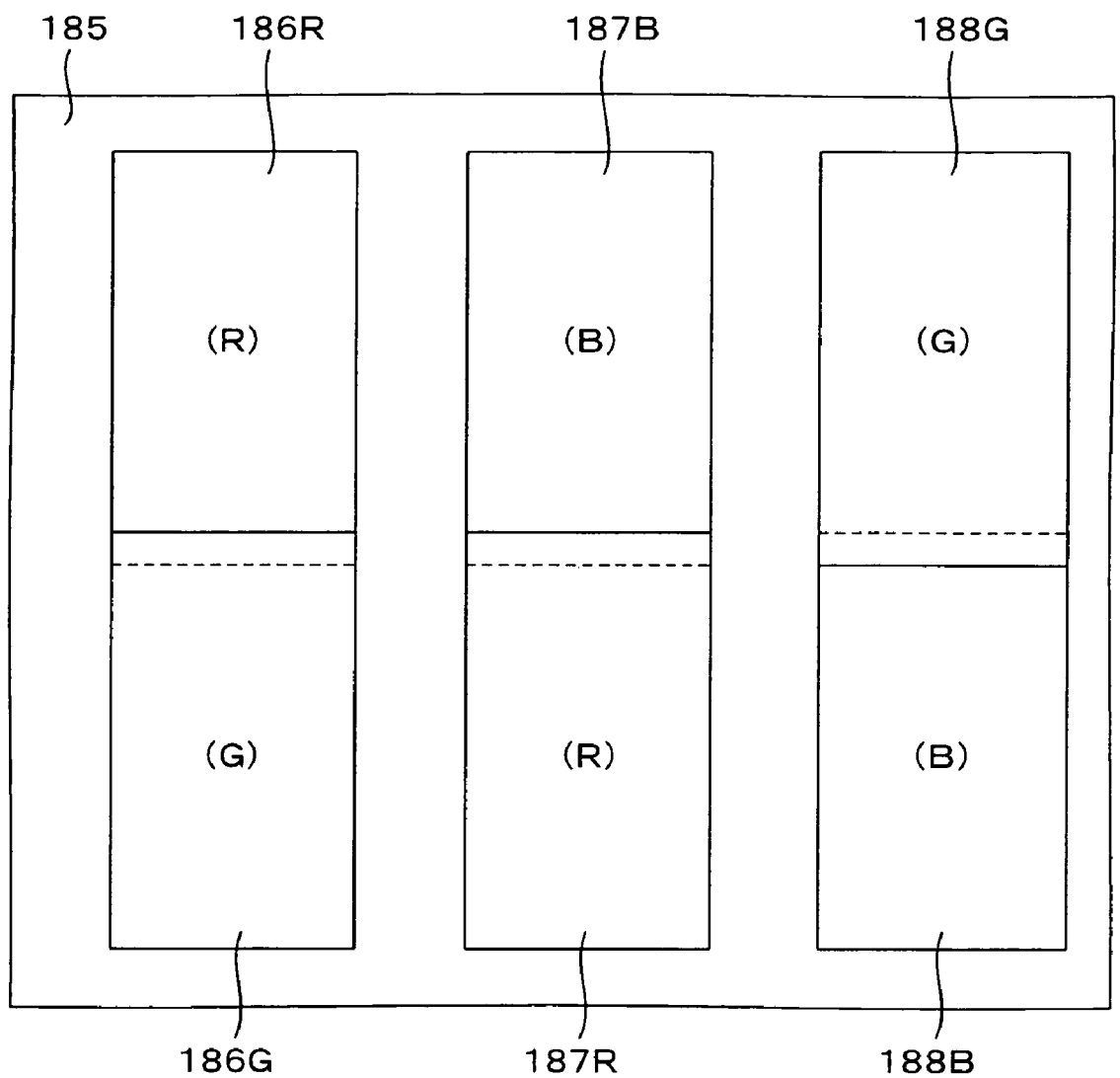
FIG. 23 is a plan view showing color filters and a black matrix formed on a counter substrate side of the liquid crystal display device according to the sixth embodiment of the present invention.

FIG. 22 is a plan view showing a pixel region on a TFT substrate of a liquid crystal display device according to the sixth embodiment of the present invention. FIG. 23 is a plan view showing color filters and a black matrix formed on a counter substrate side of the liquid crystal display device according to the sixth embodiment of the present invention.

Firstly, a layer structure of one of substrates (the TFT substrate) will be described with reference to FIG. 22.

As similar to the first embodiment, gate bus lines 102 extending in the x direction and drain bus lines 107 extending in the y direction are formed on one of the substrates (the TFT substrate). Each rectangular region defined by these gate bus lines 102 and the drain bus lines 107 constitutes a picture element region. Moreover, three picture element regions (the first picture element region $A_1$, the second picture element region $A_2$, and the third element region $A_3$) adjacent to one another along the x direction collectively constitute one pixel region P.

A picture element electrode 181R and a picture element electrode 181G are formed in the first picture element region $A_1$ along the longitudinal direction. Mean while, a picture element electrode 182B and a picture element electrode 182R are formed in the second picture element region $A_2$ along the longitudinal direction. Moreover, a picture element electrode 183G and a picture element electrode 183B are formed in the third picture element region $A_3$ along the longitudinal direction.

In each of the first to third picture element electrodes $A_1$, $A_2$, and $A_3$, a TFT 180 is formed in the vicinity of an intersection of the gate bus line 102 and the drain bus line 107. A gate electrode 173g of the TFT 180 is connected to the gate bus line 102, and a drain electrode 178d thereof is connected to the drain bus line 107.

A source electrode 178s of the TFT 180 in the first picture element region $A_1$ is electrically connected to the picture element 181R through a contact hole 179a. Meanwhile, a source electrode 178s of the TFT 180 in the second picture element region $A_2$ is electrically connected to the picture element 182B through a contact hole 179b. Moreover, a source electrode 178s of the TFT 180 in the third picture element region $A_3$ is electrically connected to the picture element 182G through a contact hole 179c.

The picture element electrode 181R in the first picture element regions $A_1$ is electrically connected to the picture element electrode 182R in the second picture element regions $A_2$ through a first interconnection 175a formed therebelow and through contact holes 176a and 176d. Meanwhile, the picture element electrode 182B in the second picture element regions $A_2$ is electrically connected to the picture element electrode 183B in the third picture element region A₃ through a second interconnection 175*b* formed therebelow and through contact holes 176*b* and 176*e*. Moreover, the picture element electrode 183G in the third picture element regions A₃ is electrically connected to the picture element electrode 181G in the first picture element regions A₁ through a third interconnection 175*c* formed therebelow and through contact holes 176*c* and 176*f*.

These picture element electrodes 181R, 181G, 182B, 182R, 183G, and 183B are made of a transparent conductive material such as ITO in a thickness of 70 nm, for example. Moreover, these picture element electrodes 181R, 181G, 182B, 182R, 183G, and 183B are covered with a first alignment film made of polyimide or the like.

Next, a layer structure of the other substrate (the counter substrate) will be described with reference to FIG. 23.

A black matrix 185 made of a light shielding film with apertures in positions facing the picture element regions A₁, A₂, and A₃ is formed on a second substrate. A red filter 186R and a green filter 186G are disposed in the positions facing the picture element electrode 181R and the picture element electrode 181G, respectively, within the first picture element region A₁. The two filters 186R and 186G overlap each other at a boundary of these filters 186R and 186G, and thereby constitute a light shielding region. Meanwhile, a blue filter 187B and a red filter 187R are disposed in the positions facing the picture element electrode 182B and the picture element electrode 182R, respectively, within the second picture element region A₂. The two filters 187B and 187R overlap each other at a boundary of these filters 187B and 187R, and thereby constitute a light shielding region. Moreover, a green filter 188G and a blue filter 188B are disposed in the positions facing the picture element electrode 183G and the picture element electrode 183B, respectively, within the third picture element region A₃. The two filters 188G and 188B overlap each other at a boundary of these filters 188G and 188B, and thereby constitute a light shielding region.

A light transmitting conductive film made of ITO or the like is formed on these filters 186R, 186G, 187B, 187R, 188G, and 188B as a counter electrode. Moreover, a second alignment film made of resin such as polyimide is formed on the counter electrode.

The TFT substrate and the counter substrate having the above-described structures are disposed in a state where the surfaces provided with the alignment films are opposed to each other. Moreover, liquid crystal having negative dielectric anisotropy, for example, is filled between these substrates.

In this embodiment as well, the same voltage is applied to the picture element electrode 186R in the first picture element region A₁ and to the picture element electrode 187R in the second picture element region A₂. Meanwhile, the same voltage is applied to the picture element electrode 187B in the second picture element region A₂ and to the picture element electrode 188B in the third picture element region A₃. Moreover, the same voltage is applied to the picture element electrode 188G in the third picture element region A₃ and to the picture element electrode 186G in the first picture element region A₁. In other words, as similar to the first to fifth embodiments, the respective color elements of red, green, and blue are spatially dispersed within one pixel region P. Accordingly, the respective color elements become inconspicuous even when the picture element regions grow in size such as in a case of a display panel for a large-size television. As a result, image quality is substantially improved as compared to a conventional liquid crystal display device. Moreover, as similar to the first to fourth embodiments, the number of the TFTs 110 is not increased as compared to a conventional liquid crystal display device.

Seventh Embodiment

A seventh embodiment of the present invention will be described below.

Figure 24:
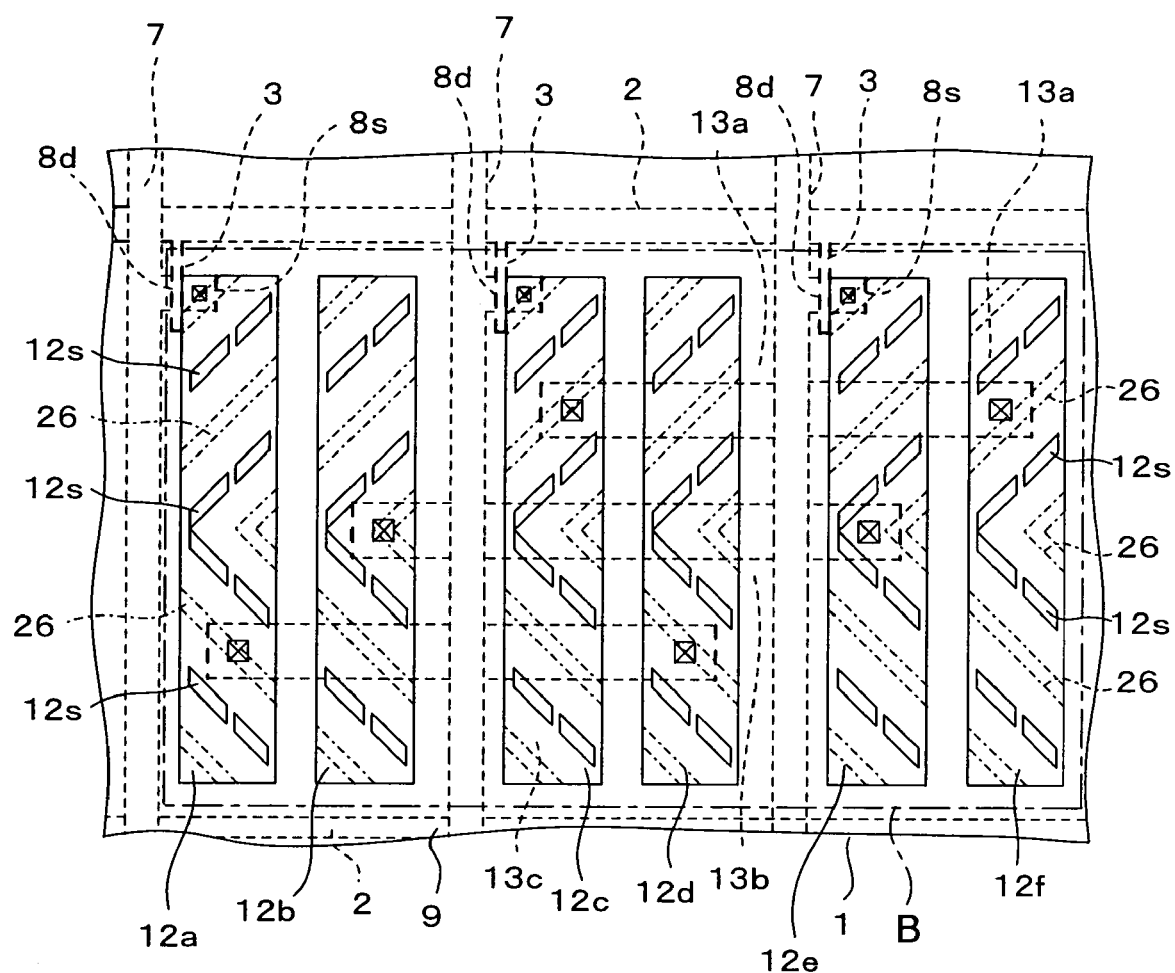
FIG. 24 is a plan view showing a pixel region of a liquid crystal display device according to a seventh embodiment of the present invention.
Figure 25:
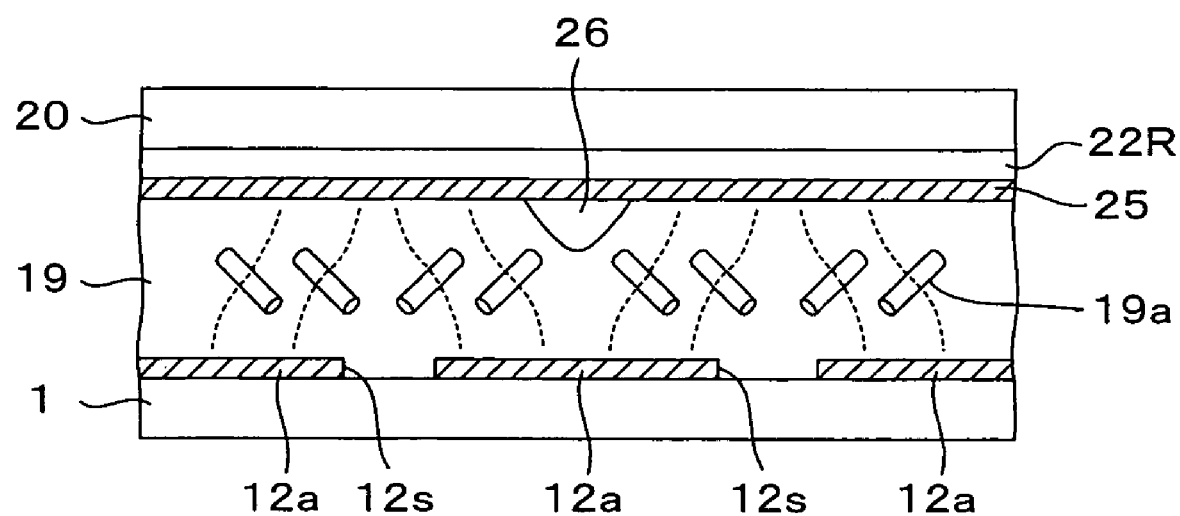
FIG. 25 is a schematic cross-sectional view of the liquid crystal display device according to the seventh embodiment of the present invention.

FIG. 24 is a plan view showing a pixel region of a liquid crystal display device according to the seventh embodiment of the present invention. Meanwhile, FIG. 25 is a schematic cross-sectional view of the liquid crystal display device according to the seventh embodiment of the present invention. This embodiment shows an example of adopting the present invention to a liquid crystal display device of a multi-domain vertical alignment (MVA) mode. In FIG. 24 and FIG. 25, the same reference numerals designate the same elements as shown in FIG. 1 and FIG. 4, and detailed description thereof will be omitted.

On the picture element electrodes 12*a* to 12*f* provided on one of substrates (a TFT substrate) 1, slits 12*s* are provided along lines which extend in oblique directions and are bent at the centers in the longitudinal direction of the picture element electrodes 12*a* to 12*f*. As similar to the first embodiment, the picture element electrodes 12*a* to 12*f* provided with these slits 12*s* are covered with an alignment film made of polyimide or the like.

Meanwhile, on a counter electrode 25 (which is illustrated downward in FIG. 25) of the other substrate (a counter substrate) 20, domain control protrusions (mounds) 26 are formed so as to extend in parallel to the slits 12*s*. The protrusions 26 can be easily formed by use of photoresist, for example. The surfaces of the counter electrode 25 and the protrusions 26 are covered with an alignment film made of polyimide or the like. Moreover, the liquid crystal 19 having negative dielectric anisotropy is filled between the substrates 1 and 20.

As described above, the slits and the protrusions on the electrodes are used as domain control structures in the liquid crystal display device of the MVA mode. Alternatively, a ditch on substrates may be used as such domain control structures. In the liquid crystal display device of the MVA mode, liquid crystal molecules are tilted into different directions on one side and the other side of the domain control structures upon application of a voltage applied to the picture element electrode, thus achieving so-called multi-domain.

For example, when the slits 12*s* are provided on the picture element electrodes 12*a* to 12*f* as shown in this embodiment, an electric field is generated in an oblique direction toward the center of each slit 12*s* at an edge of the slit 12*s*. Accordingly, as shown in FIG. 25, the liquid crystal molecules 19*a* are tilted into different directions between both sides of the slit 12*s*.

Moreover, when the protrusions 26 are provided on the counter electrode 25, the liquid crystal molecules in the vicinity of each protrusion 26 are aligned in perpendicular directions to the surface of the protrusion 26 when a voltage is not applied. Accordingly, the liquid crystal molecules are aligned in different directions between both sides of the protrusion 26. Due to an influence of the liquid crystal molecules, an alignment direction of liquid crystal molecules 19*a* in a distant position from the protrusion 26 is determined when a voltage is applied between the picture element electrodes 12*a* to 12*f* and the counter electrode 25. In this way, a display performance, especially, a view angle characteristic of the liquid crystal display device is substantially improved by providing a plurality of regions in which the liquid crystal molecules 19a are aligned in mutually different directions upon application of a voltage.

In this embodiment as well, the respective color elements of red, green, and blue are spatially dispersed within one pixel region B as similar to the first embodiment. Accordingly, the respective color elements become inconspicuous even when the picture element regions grow in size such as in a case of a display panel for a large-size television. As a result, image quality is substantially improved as compared to a conventional liquid crystal display device.

Eighth Embodiment

An eighth embodiment of the present invention will be described below. The first to seventh embodiments have been described on the liquid crystal display device in which the picture element electrodes are formed on one of the substrates and the counter electrode is formed on the other substrate. In this embodiment, an example of adopting the present invention to a liquid crystal display device of an in-plane switching (IPS) mode in which picture element electrodes and counter electrodes are formed on one of the substrates, will be described.

Figure 26:
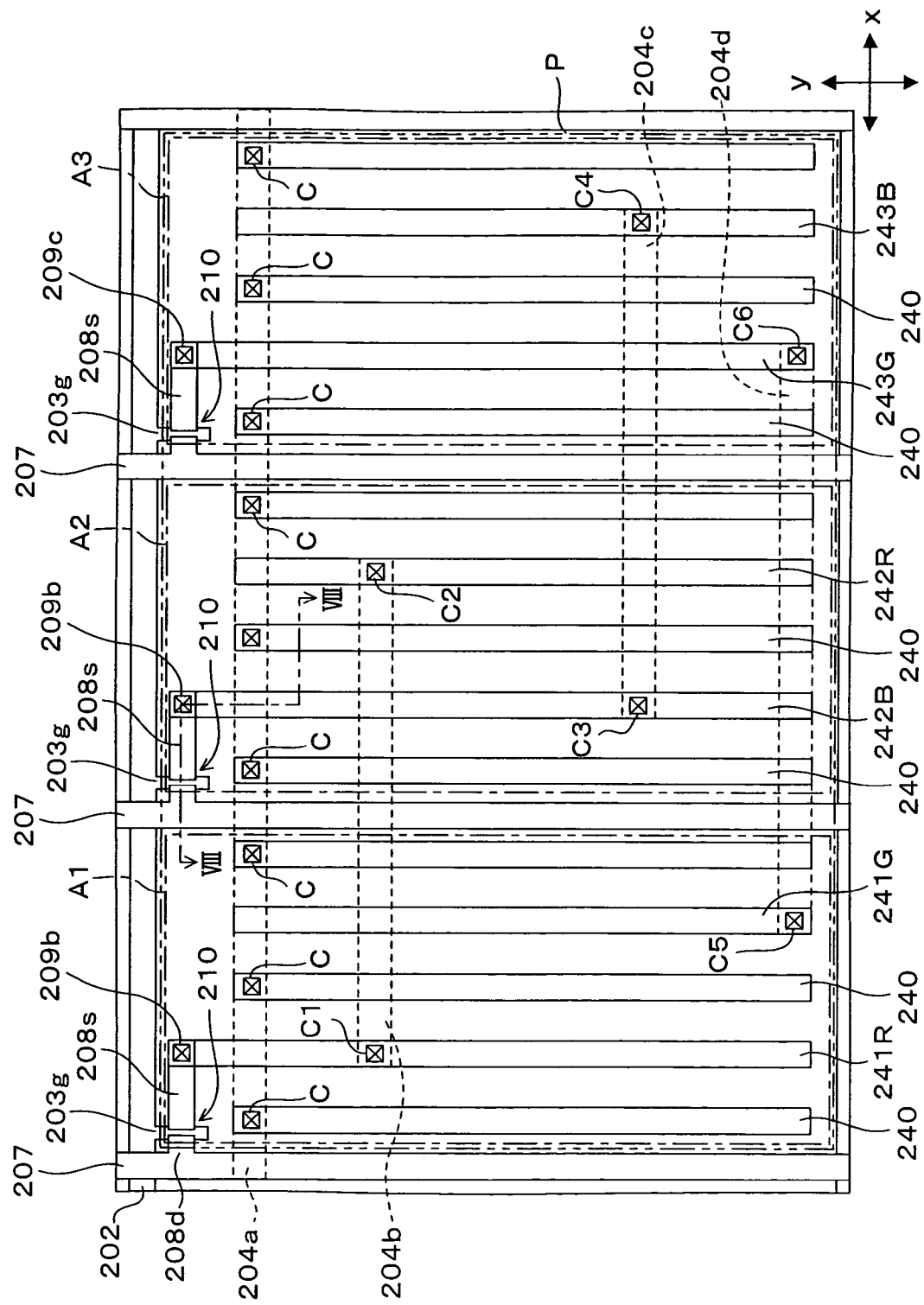
FIG. 26 is a plan view showing a pixel region of a liquid crystal display device according to an eighth embodiment of the present invention.

FIG. 26 is a plan view showing a pixel region on one of substrates (a TFT substrate) of a liquid crystal display device according to an eighth embodiment of the present invention.

Gate bus lines 202 extending in the x direction and drain bus lines 207 extending in the y direction are formed on one of the substrates (the TFT substrate). Each rectangular region defined by these gate bus lines 202 and drain bus lines 207 constitutes a picture element region. Moreover, three picture element regions (a first picture element region $A_1$, a second picture element region $A_2$, and a third element region $A_3$) which are adjacent along the x direction collectively constitute one pixel region P.

In each of the first to third picture element electrodes $A_1$, $A_2$, and $A_3$, a TFT 210 is formed in the vicinity of an intersection of the gate bus line 202 and the drain bus line 207. A gate electrode 203g of each of the TFTs 210 is connected to the gate bus line 202, and a drain electrode 208d thereof is connected to the drain bus line 207.

Three bar-shaped counter electrodes 240 and bar-shaped picture element electrodes 241R and 241G are formed in the first picture element region $A_1$. These counter electrodes 240 and the picture element electrodes 241R and 241G are formed in parallel to the drain bus lines 207. The picture element electrode 241R is disposed between the first and second counter electrodes 240 and the picture element electrode 241G is disposed between the second and third counter electrodes 240.

Similarly, three bar-shaped counter electrodes 240 and bar-shaped picture element electrodes 242B and 242R are formed in the second picture element region $A_2$. The picture element electrode 242B is disposed between the first and second counter electrodes 240 and the picture element electrode 242R is disposed between the second and third counter electrodes 240. Moreover, three bar-shaped counter electrodes 240 and bar-shaped picture element electrodes 243G and 243B are formed in the third picture element region $A_3$. The picture element electrode 243G is disposed between the first and second counter electrodes 240 and the picture element electrode 243B is disposed between the second and third counter electrodes 240.

The picture element electrode 241R formed in the first picture element region $A_1$ is electrically connected to a source electrode 208s of the TFT 210 therein through a contact hole 209a. Similarly, the picture element electrode 242B formed in the second picture element region $A_2$ is electrically connected to a source electrode 208s of the TFT 210 therein through a contact hole 209b. Moreover, the picture element electrode 243G formed in the third picture element region $A_3$ is electrically connected to a source electrode 208s of the TFT 210 therein through a contact hole 209c.

The counter electrodes 240 formed in the first to third picture element regions $A_1$, $A_2$, and $A_3$ are electrically connected to a counter electrode bus line 204a formed therebelow through contact holes C. Meanwhile, the picture element electrode 241R in the first picture element region $A_1$ is electrically connected to the picture element electrode 242R in the second picture element region $A_2$ through a first interconnection 204b formed therebelow and through contact holes C1 and C2. Moreover, the picture element electrode 242B in the second picture element region $A_2$ is electrically connected to the picture element electrode 243B in the third picture element region $A_3$ through a second interconnection 204c formed therebelow and through contact holes C3 and C4. Furthermore, the picture element electrode 243G in the third picture element region $A_3$ is electrically connected to the picture element electrode 241G in the first picture element region $A_1$ through a third interconnection 204d formed therebelow and through contact holes C5 and C6.

Figure 27:
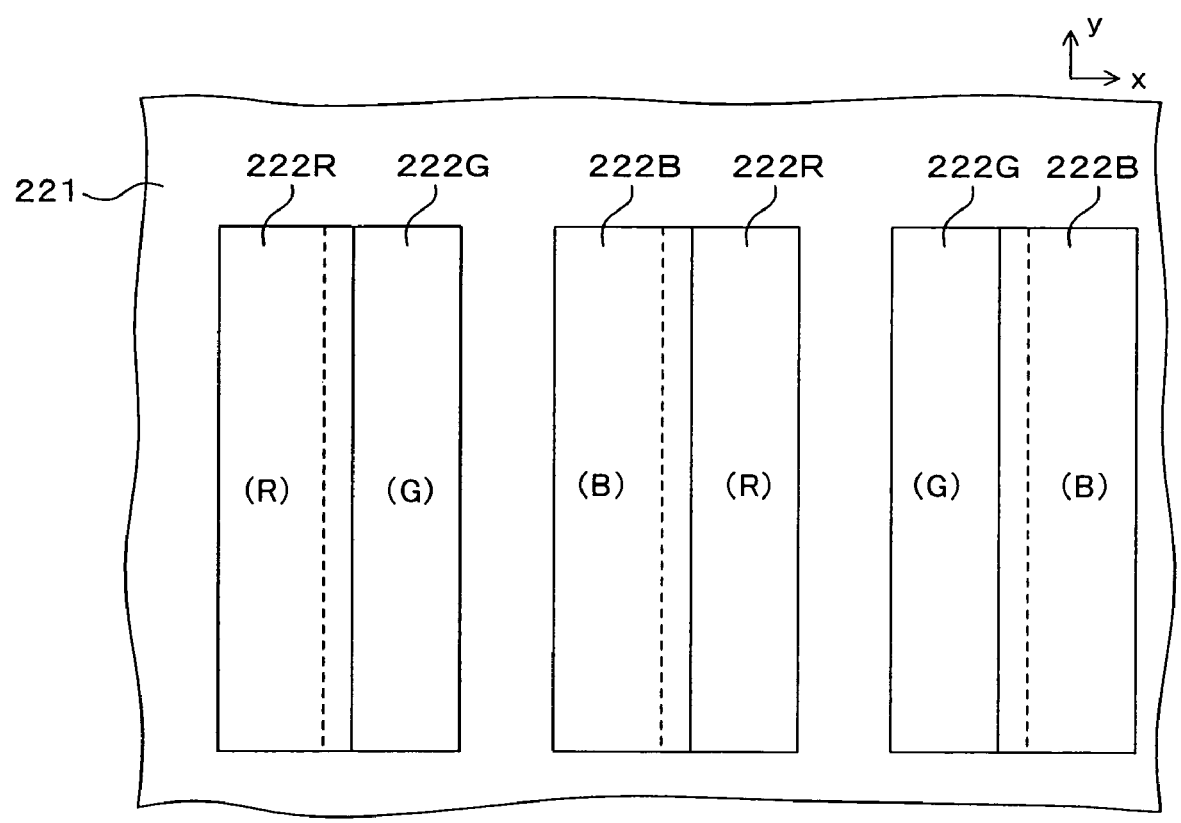
FIG. 27 is a plan view showing color filters and a black matrix formed on a counter substrate side according to the eighth embodiment of the present invention.
Figure 28:
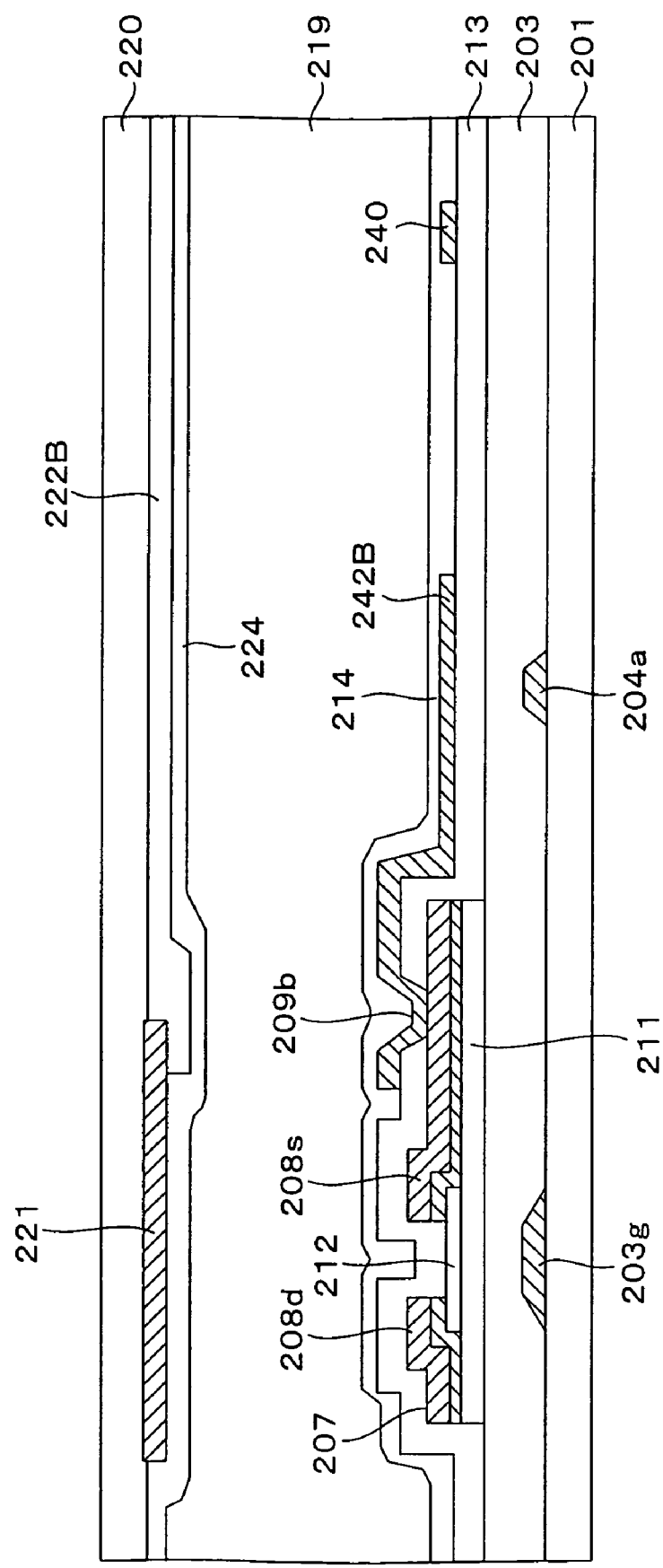
FIG. 28 is a schematic cross-sectional view taken along the VIII—VIII line in FIG. 26.

FIG. 27 is a plan view showing color filters and a black matrix formed on a counter substrate side according to the eighth embodiment of the present invention. Meanwhile, FIG. 28 is a schematic cross-sectional view taken along the VIII—VIII line in FIG. 26. Note that FIG. 27 shows the arrangement which is viewed from a side of the substrate where the color filters and the black matrix are not formed thereon.

Firstly, a layer structure of a first substrate (the TFT substrate) 201 will be described with reference to FIG. 26 and FIG. 28.

The gate bus lines 202, the gate electrodes 203g of the TFTs 210, the counter electrode bus line 204a, and the first to third interconnections 204b to 204d are formed either directly or through an insulating film on the first substrate 201 which is made of a light transmitting insulative material such as glass, vitreous silica or a plastic film. These gate bus lines 202, the gate electrodes 203g of the TFTs 210, the counter electrode bus line 204a, and the first to third interconnections 204b to 204d are covered with a gate insulating film 203 as similar to the first embodiment.

The drain bus lines 207 are formed on the gate insulating film 203. Meanwhile, a semiconductor layer 211 constituting an active layer of the each of TFTs 210 is formed on a predetermined region of the gate insulating film 203 as similar to the first embodiment, and a channel protective insulating film 212 is formed on this semiconductor layer 211. The source electrodes 208s and the drain electrodes 208d of the TFTs 210 are formed on the semiconductor layer 211 and the channel protective insulating film 212. The drain electrodes 208d are connected to the drain bus lines 207. Here, each of the source electrodes 208s and the drain electrodes 208d has a two-layer structure including a high concentration impurity semiconductor layer formed on the semiconductor layer 211 and a metal layer formed on this high concentration impurity semiconductor layer.

These TFTs 210 and the drain bus lines 207 are covered with a protective insulating film 213 which is made of silicon oxide or silicon nitride.

The picture element electrodes 241R, 241G, 242B, 242R, 243G, and 243B, and the counter electrodes 240 are formed on the protective insulating film 213. As described previously, the picture element electrode 241R in the first picture element region $A_1$ is connected to the TFT 210 in the first picture element region $A_1$ through the contact hole 209a. Meanwhile, the picture element electrode 242B in the second picture element region $A_2$ is connected to the TFT 210 in the second picture element region $A_2$ through the contact hole 209b. Moreover, the picture element electrode 243G in the third picture element region $A_3$ is connected to the TFT 210 in the third picture element region $A_3$ through the contact hole 209c. In the meantime, the counter electrodes 240 in the respective picture element regions $A_1$, $A_2$, and $A_3$ are connected to the counter electrode bus lines 204a through the contact holes C.

The picture element electrodes 241R, 241G, 242B, 242R, 243G, and 243B, and the counter electrodes 240 are covered with a first alignment film 214 which is made of resin such as polyimide.

Next, a second substrate (the counter substrate) and a layer structure thereon will be described with reference to FIG. 27 and FIG. 28.

On one of the surfaces of the second substrate 220, there is formed a black matrix 221 which is provided with apertures in positions corresponding to the respective picture element regions $A_1$, $A_2$, and $A_3$ Meanwhile, red filters 222R are formed at a portion corresponding to the picture element electrode 241R and regions on both sides thereof in the first picture element region $A_1$, and the picture element electrode 242R and regions on both sides thereof in the second picture element region $A_2$. Green filters 222G are formed at a portion corresponding to the picture element electrode 241G and regions on both sides thereof in the first picture element region $A_1$, and the picture element electrode 243G and regions on both sides thereof in the third picture element region $A_3$. Moreover, blue filters 222B are formed at a portion corresponding to the picture element electrode 242B and regions on both sides thereof in the second picture element region $A_2$, and the picture element electrode 243B and regions on both sides thereof in the third picture element region $A_3$.

A second alignment film 224 made of resin such as polyimide is formed on the red filters 222R, the green filters 222G, and the blue filters 222B.

The first substrate 201 and the second substrate 220 having the above-described structures are disposed in a state where the first alignment film 214 and the second alignment film 224 are opposed to each other. Moreover, liquid crystal 219 having positive dielectric anisotropy, for example, is filled between the first substrate 201 and the second substrate 220.

Figure 29A:
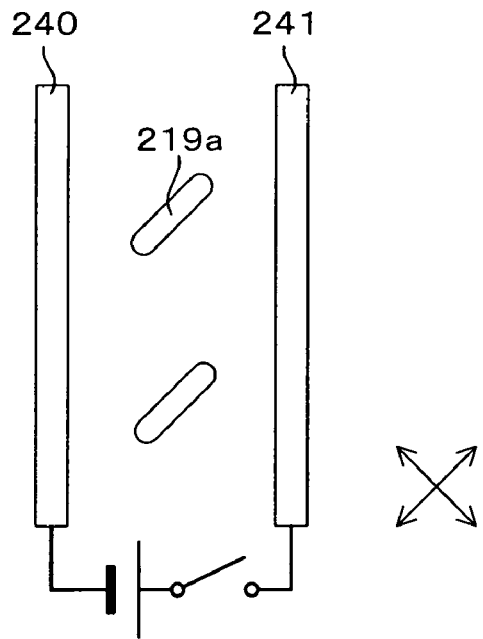
FIGS. 29A and 29B are schematic drawings showing an operation of a liquid crystal display device of an IPS mode.
Figure 29B:
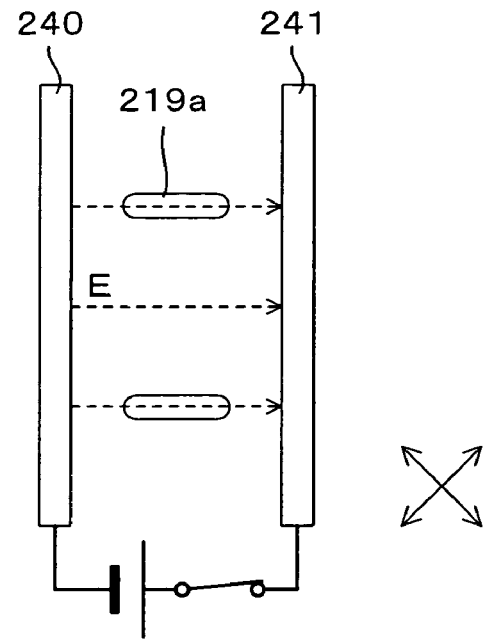

FIGS. 29A and 29B are schematic drawings showing an operation of the liquid crystal display device of the IPS mode. Arrows in the drawings indicate directions of polarization axes of two polarizing plates to be disposed so as to sandwich a liquid crystal panel. Moreover, the first and second alignment films 214 and 224 are subjected to rubbing in the same direction as the polarization axis of one of the polarizing plate.

In a state where a voltage is not applied between the picture element electrode 241 and the counter electrode 240, liquid crystal molecules 219a are aligned along the rubbing direction of the alignment films 214 and 224. In this case, polarized light which passed through one of the polarizing plates further passes through the liquid crystal panel without twisting the oscillating thereof. Accordingly, the polarized light is shielded by the other polarizing plate. That is, dark display occurs in this case.

When a sufficient voltage is applied between the picture element electrode 241 and the counter electrode 240, the liquid crystal molecules 219a are aligned along a parallel direction to an electric field E. In this case, the oscillating of the polarized light which passed through one of the polarizing plates is twisted by the liquid crystal molecules 219a in the liquid crystal panel, and thereby the polarized light passes through the other polarizing plate. Therefore, bright display occurs in this case. Therefore, it is possible to display a desired image on the liquid crystal display device by controlling the voltages to be applied between the picture element electrodes 241 and the counter electrodes 240 depending on the pixels.

In this embodiment as well, the color elements (the color filters) of red, green, and blue are spatially dispersed within one pixel region P. Accordingly, the color elements become inconspicuous even when the picture element regions grow in size such as in a case of a display panel for a large-size television. As a result, image quality is substantially improved as compared to a conventional liquid crystal display device. Moreover, since the three color elements of red, green, and blue in one pixel region P are driven by three TFTs, the number of the TFTs is not increased as compared to a conventional liquid crystal display device.

Figure 30:
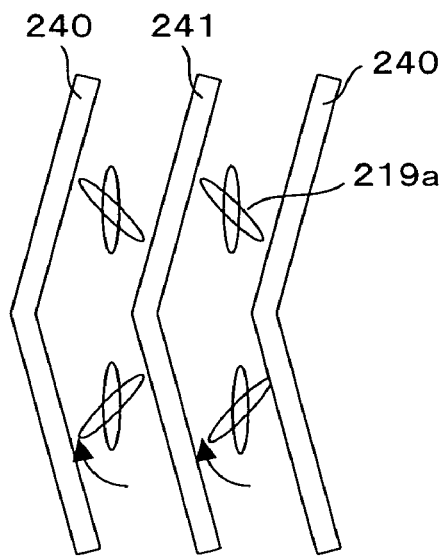
FIG. 30 is a schematic drawing showing a liquid crystal display device of the IPS mode including picture element electrodes and counter electrodes formed into bent shapes.

Since, the liquid crystal molecules are always aligned parallel to the surface of the substrate in the liquid crystal display device of the IPS mode, the liquid crystal display device of the IPS mode has an excellent view angle characteristic in principle. However, if the picture element electrodes 241 and the counter electrodes 240 are formed into bent shapes as shown in a schematic drawing of FIG. 30, color change depending on the view angle is suppressed further and a view angle characteristic improves further. The present invention is also applicable to the liquid crystal display device of the IPS mode of this type.

As described above, the present invention is applicable to various modes of liquid crystal display devices for performing color display by use of color filters including a liquid crystal display device of a twisted nematic (TN) mode, a liquid crystal display device of a vertically aligned (VA) mode, a liquid crystal display device of the MVA mode, a liquid crystal display device of the IPS mode, and a liquid crystal display device of an optically compensated birefringence (OCB) mode.

Figure 31A:
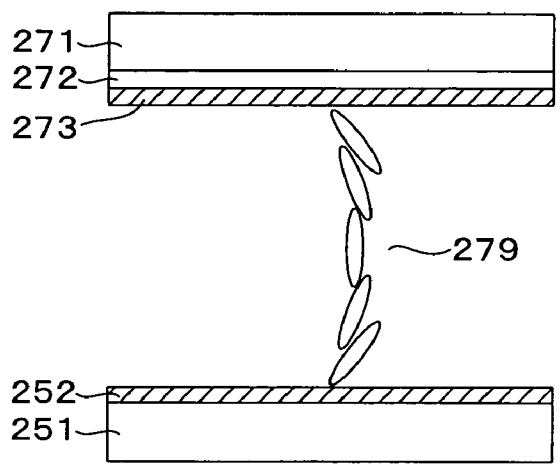
FIGS. 31A and 31B are schematic drawings a state of alignment of liquid crystal molecules in a liquid display device of an OCB mode.

FIG. 31A is showing an alignment state of liquid crystal molecules. Here, the example of liquid crystal having negative dielectric anisotropy. FIG. 31A is showing an alignment state of the liquid crystal molecules at the time of an OFF state, and FIG. 31B is showing an alignment state of the liquid crystal molecules at the time of an ON state.

Figure 31B:
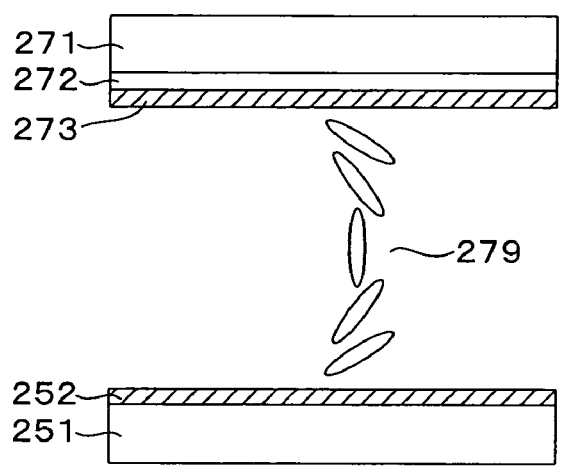

In the liquid crystal display device of the OCB mode, a picture element electrode 252 is formed on one substrate 251, and a counter electrode 273 is formed on the other substrate 271 (which are illustrated downward in FIGS. 31A and 31B).

Moreover, an optical compensation film 272 is formed at least in one of the substrates 251 and 271. Moreover, liquid crystal molecules 279 are set to bent alignment between the picture element electrode 252 and the counter electrode 273, and inclination angles of the liquid crystal molecules 279 in the vicinities of the picture element electrode 252 and the counter electrode 273 are changed by the voltage which is applied between the picture element electrode 252 and the counter electrode 273.

This liquid crystal display device of the OCB mode has a structure of filling the liquid crystal between the pair of electrodes (the picture element electrode and the counter electrode) which are disposed with an interval in the perpendicular direction to the surface of the substrates as similar to a liquid crystal display devices of the MVA mode or the TN mode. Accordingly, the basic structure is the same as the liquid crystal display device explained in the first embodiment. Accordingly, the present invention is also applicable to the liquid crystal display device of the OCB mode as similar to the above-described embodiments.

Note that the interconnections for connecting the picture element electrodes formed in different picture element regions are formed on the same layer as the gate bus lines in the first, third, and fifth to eighth embodiments described above. However, the mode of formation of the interconnections is not limited to the foregoing. For example, it is possible to form the interconnections above or below the gate bus lines through an insulating film.

Meanwhile, in the first to eighth embodiment, the liquid crystal display devices in which the red, green, and blue color filters are used have been described. However, the present invention is not limited to these embodiment. For example, the present invention is also applicable to a liquid crystal display device using cyan (C), magenta (M), and yellow (Y) filters as the color filters, and to a liquid crystal display device using other colors for the color filters.

Moreover, the three picture element regions $A_1$, $A_2$, and $A_3$ constituting one pixel region are disposed along the gate bus lines in the respective embodiments described above. However, it is also possible to set the picture element regions $A_1$, $A_2$, and $A_3$ in delta arrangement, for example.

Furthermore, the TFTs in the above-described embodiments adopt the bottom gate structure. However, the TFTs may also adopt the top gate structure. Similarly, the manufacturing process and the structures of the TFTs are not limited to the examples disclosed in the embodiments. Needless to say, other structures, which can be easily applied, to achieve high resolution display by use of the dispersedly arranged picture element electrodes and color filters in the present invention are included in the scope of the present invention.

According to the above-described embodiments, coarse display attributable to the conventional dimensions of the respective color pixels (red, green, and blue) is modified into smooth display by adopting the structure of dispersedly arranging the first, second, and third picture element electrodes and also dispersedly arranging the color filters so as to correspond to the picture element electrodes. The technique disclosed in the present invention will occupy a very important place in the technology for large-size display devices which are expected to achieve substantial market expansion in the future.

What is claimed is:

1. A liquid crystal display device formed by filling liquid crystal between a pair of substrates and provided with a plurality of picture element regions defined by gate bus lines and drain bus lines, the liquid crystal display device comprising:
    active elements respectively formed in the plurality of the picture element regions;
    a first picture element electrode disposed in part of a first picture element region and in at least any one of part of a second picture element region and part of a third picture element region, where the first picture element region, the second picture element region, and the third picture element region are part of the plurality of picture element regions, the first picture element electrode being electrically connected to the active element in the first picture element region;
    a second picture element electrode disposed in part of the second picture element region and in at least any one of part of the first picture element region and part of the third picture element region, the second picture element electrode being electrically connected to the active element in the second picture element region;
    a third picture element electrode disposed in part of the third picture element region and in at least any one of part of the first picture element region and part of the second picture element region, the third picture element electrode being electrically connected to the active element in the third picture element region;
    a first color filter dispersedly arranged to correspond to the first picture element electrode;
    a second color filter dispersedly arranged to correspond to the second picture element electrode; and
    a third color filter dispersedly arranged to correspond to the third picture element electrode.

2. The liquid crystal display device according to claim 1, wherein the first picture element electrodes, the second picture element electrodes, and the third picture element electrodes are sequentially arranged two or three times in a repeating manner in the pixel region composed of plurality of picture element regions.

3. The liquid crystal display device according to claim 1, wherein the first picture element electrode in the first picture element region is electrically connected to at least any one of the first picture element electrode in the second picture element region and the first picture element electrode in the third picture element region through a first interconnection formed on a different layer,
    the second picture element electrode in the second picture element region is electrically connected to at least any one of the second picture element electrode in the first picture element region and the second picture element electrode in the third picture element region through a second interconnection formed on a different layer, and
    the third picture element electrode in the third picture element region is electrically connected to at least any one of the third picture element electrode in the first picture element region and the third picture element electrode in the second picture element region through a third interconnection formed on a different layer.

4. The liquid crystal display device according to claim 3, wherein the first interconnection, the second interconnection, and the third interconnection are formed on the same layer as the gate bus lines with provision of intervals, and severally extend in the same direction as the gate bus lines.

5. The liquid crystal display device according to claim 3, wherein the first picture element electrode is separated and formed severally in the first and the second picture element regions,
    the second picture element electrode is separated and formed severally in the second and the third picture element regions, and
    the third picture element electrode is separated and formed severally in the first and the third picture element regions.

6. The liquid crystal display device according to claim 3, wherein the first picture element electrode, the second picture element electrode, and the third picture element electrode are separated and disposed severally in the first picture element region, the second picture element region, and the third picture element region.

7. The liquid crystal display device according to claim 1, wherein each of the first picture element electrode, the second picture element electrode, and the third picture element electrode has a rectangular planar shape.

8. The liquid crystal display device according to claim 1, wherein the first picture element electrode in the first picture element region and at least any one of the first picture element electrode in the second picture element region and the first picture element electrode in the third picture element region are integrated into a first conductive pattern, the second picture element electrode in the second picture element region and at least any one of the second picture element electrode in the first picture element region and the second picture element electrode in the third picture element region are integrated into a second conductive pattern, and the third picture element electrode in the third picture element region and at least any one of the third picture element electrode in the first picture element region and the third picture element electrode in the second picture element region are integrated into a third conductive pattern.

9. The liquid crystal display device according to claim 8, wherein the first conductive pattern has a shape starting from part of the first picture element region to reach part of the second picture element region, the second conductive pattern has a shape starting from part of the second picture element region to reach part of the third picture element region, and the third conductive pattern has a shape starting from part of the third picture element region to reach part of the first picture element region.

10. The liquid crystal display device according to claim 8, wherein the first conductive pattern, the second conductive pattern, and the third conductive pattern are respectively disposed in the first, the second, and the third picture element regions in a mutually detouring manner.

11. The liquid crystal display device according to claim 1, wherein each of the first color filter, the second color filter, and the third color filter has a rectangular planar shape in the first, the second, and the third picture element regions, respectively.

12. The liquid crystal display device according to claim 1, wherein the first color filters dispersedly arranged in the pixel region are integrated together along at least any one of the gate bus line and the drain bus line, the second color filters dispersedly arranged in the pixel region are integrated together along at least any one of the gate bus line and the drain bus line, and the third color filters dispersedly arranged in the pixel region are integrated together along at least any one of the gate bus line and the drain bus line.

13. The liquid crystal display device according to claim 1, wherein the first color filter, the second color filter, and the third color filter are filters having mutually different colors selected from red, green and blue.

14. The liquid crystal display device according to claim 1, further comprising:

a fourth picture element electrode for white display not facing a color filter, the fourth picture element electrode being provided in at least any one of the first picture element region, the second picture element region, and the third picture element region.

15. The liquid crystal display device according to claim 1, wherein a domain control structure for achieving multi-domain is provided on at least any of the pair of substrates.

16. The liquid crystal display device according to claim 15, wherein the domain control structure is any one of a protrusion, a slit on any of the electrodes, and a ditch on any of the substrates.

17. The liquid crystal display device according to claim 1, wherein the liquid crystal adopts any one of an in-plane switching mode, a vertically aligned mode, a multi-domain vertical alignment mode, and an optically compensated birefringence mode.

* * * * *